(12) United States Patent
Yakes et al.

(10) Patent No.: US 12,049,136 B2
(45) Date of Patent: Jul. 30, 2024

(54) REFUSE VEHICLE WITH RANGE EXTENSION

(71) Applicant: Oshkosh Corporation, Oshkosh, WI (US)

(72) Inventors: Christopher K. Yakes, Oshkosh, WI (US); Nader Nasr, Neenah, WI (US); Robert S. Messina, Oshkosh, WI (US); Joshua D. Rocholl, Rochester, MN (US); Derek A. Wente, Austin, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US); Jeff Koga, Oshkosh, WI (US); Emily Davis, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 411 days.

(21) Appl. No.: 17/483,386

(22) Filed: Sep. 23, 2021

(65) Prior Publication Data

US 2022/0009338 A1 Jan. 13, 2022

Related U.S. Application Data

(63) Continuation-in-part of application No. 17/221,255, filed on Apr. 2, 2021, now Pat. No. 11,648,834, (Continued)

(51) Int. Cl.
*B60K 6/46* (2007.10)
*B60L 1/00* (2006.01)
(Continued)

(52) U.S. Cl.
CPC ............... *B60K 6/46* (2013.01); *B60L 1/003* (2013.01); *B65F 3/041* (2013.01); *B65F 2003/025* (2013.01)

(58) Field of Classification Search
CPC . B60K 6/46; B60L 1/003; B60L 58/12; B65F 3/041; B65F 2003/025; B65F 3/14;
(Continued)

(56) References Cited

U.S. PATENT DOCUMENTS 3,662,911 A 5/1972 Harman
3,666,126 A 5/1972 Rempel
(Continued)

OTHER PUBLICATIONS

U.S. Appl. No. 16/851,152, filed Apr. 17, 2020, Oshkosh Corporation.
(Continued)

*Primary Examiner* — Mussa A Shaawat
(74) *Attorney, Agent, or Firm* — Foley & Lardner LLP

(57) ABSTRACT

A range extension system for a refuse vehicle includes a battery, and a controller. The battery is configured to provide electrical energy for accessories of the refuse vehicle. The controller is configured to obtain a state of charge of the battery and limit operation of at least one of the accessories in response to the state of charge of the battery to extend a transportation range of the refuse vehicle.

20 Claims, 11 Drawing Sheets

Related U.S. Application Data which is a continuation of application No. 17/007,605, filed on Aug. 31, 2020, now Pat. No. 11,001,135, which is a continuation of application No. 16/943,295, filed on Jul. 30, 2020, now Pat. No. 11,007,863.

(60) Provisional application No. 62/881,089, filed on Jul. 31, 2019.

(51) Int. Cl.
 *B65F 3/04* (2006.01)
 *B65F 3/02* (2006.01)

(58) Field of Classification Search
 CPC ........ B65F 2003/0279; B60W 2300/12; Y02T 10/70; Y02T 10/62; Y02T 30/10
 See application file for complete search history.

(56) References Cited

U.S. PATENT DOCUMENTS

| | | |
|---|---|---|
| 3,771,674 A | 11/1973 | Clucker |
| 3,804,277 A | 4/1974 | Brown et al. |
| 4,016,988 A | 4/1977 | Dahlin |
| 4,096,959 A * | 6/1978 | Schaffler ............ B65F 3/205 414/525.5 |
| 4,175,903 A | 11/1979 | Carson |
| 4,200,330 A | 4/1980 | Scott |
| 4,225,182 A | 9/1980 | Werner |
| 4,229,135 A | 10/1980 | Malmros |
| 4,252,495 A | 2/1981 | Cook |
| 4,286,911 A | 9/1981 | Benjamin |
| 4,441,848 A | 4/1984 | Bailey |
| 4,618,306 A | 10/1986 | Dorsch |
| 4,704,062 A | 11/1987 | Hale |
| 4,771,837 A | 9/1988 | Appleton et al. |
| 5,171,121 A | 12/1992 | Smith et al. |
| 5,378,010 A | 1/1995 | Marino et al. |
| 5,607,277 A | 3/1997 | Zopf |
| 5,639,201 A | 6/1997 | Curotto |
| 5,731,705 A | 3/1998 | Guinn |
| 5,833,428 A | 11/1998 | Szinte |
| 5,919,026 A | 7/1999 | Appleton |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | McNeilus et al. |
| 5,984,609 A | 11/1999 | Bartlett |
| 6,033,176 A | 3/2000 | Bartlett |
| 6,062,803 A | 5/2000 | Christenson |
| 6,071,057 A | 6/2000 | Duron et al. |
| 6,089,813 A | 7/2000 | McNeilus et al. |
| 6,105,984 A | 8/2000 | Schmitz et al. |
| 6,120,235 A | 9/2000 | Humphries et al. |
| 6,123,500 A | 9/2000 | McNeilus et al. |
| 6,135,536 A | 10/2000 | Ciavaglia et al. |
| 6,210,094 B1 | 4/2001 | McNeilus et al. |
| 6,213,706 B1 | 4/2001 | Christenson |
| 6,224,317 B1 | 5/2001 | Kann et al. |
| 6,224,318 B1 | 5/2001 | McNeilus et al. |
| 6,247,713 B1 | 6/2001 | Konop |
| 6,266,598 B1 | 7/2001 | Pillar et al. |
| 6,315,515 B1 | 11/2001 | Young et al. |
| 6,336,783 B1 | 1/2002 | Young et al. |
| 6,350,098 B1 | 2/2002 | Christenson et al. |
| 6,421,593 B1 | 7/2002 | Kempen et al. |
| 6,447,239 B2 | 9/2002 | Young et al. |
| 6,474,928 B1 | 11/2002 | Christenson |
| 6,497,547 B1 | 12/2002 | Marglaras |
| 6,516,914 B1 | 2/2003 | Andersen et al. |
| 6,553,290 B1 | 4/2003 | Pillar |
| 6,565,305 B2 | 5/2003 | Schrafel |
| 6,652,213 B1 | 11/2003 | Mitchell et al. |
| 6,843,148 B2 | 1/2005 | Marcel |
| 7,018,155 B1 | 3/2006 | Heberling et al. |
| 7,070,382 B2 | 7/2006 | Pruteanu et al. |
| 7,261,354 B1 | 8/2007 | Lozano |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,597,172 B1 * | 10/2009 | Kovach ............ F16H 47/02 180/305 |
| 7,654,354 B1 | 2/2010 | Otterstrom |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,607 B2 | 1/2013 | Bretschneider et al. |
| 8,360,706 B2 | 1/2013 | Addleman et al. |
| 8,398,176 B2 | 3/2013 | Haroldsen et al. |
| 8,540,475 B2 | 9/2013 | Kuriakose et al. |
| 8,550,764 B2 | 10/2013 | Rowland et al. |
| 8,554,643 B2 | 10/2013 | Kortelainen |
| 8,807,613 B2 | 8/2014 | Howell et al. |
| 8,857,567 B1 | 10/2014 | Raymond |
| 9,045,014 B1 | 6/2015 | Verhoff et al. |
| 9,067,730 B2 | 6/2015 | Curotto |
| 9,114,804 B1 | 8/2015 | Shukla et al. |
| 9,132,736 B1 | 9/2015 | Shukla et al. |
| 9,174,686 B1 | 11/2015 | Messina et al. |
| 9,216,856 B2 | 12/2015 | Howell et al. |
| 9,290,093 B2 | 3/2016 | Turner et al. |
| 9,296,558 B2 | 3/2016 | Parker |
| 9,376,102 B1 | 6/2016 | Shukla et al. |
| 9,511,932 B2 | 12/2016 | Curotto et al. |
| 9,656,640 B1 | 5/2017 | Verhoff et al. |
| 9,707,869 B1 | 7/2017 | Messina et al. |
| 9,880,581 B2 | 1/2018 | Kuriakose et al. |
| 9,902,559 B2 | 2/2018 | Parker |
| 9,919,702 B1 * | 3/2018 | Wang ............ B60L 50/15 |
| 9,926,134 B2 | 3/2018 | Ford |
| 9,981,803 B2 | 5/2018 | Davis et al. |
| 10,035,648 B2 | 7/2018 | Haddick et al. |
| 10,144,584 B2 * | 12/2018 | Parker ............ B65F 3/041 |
| 10,144,585 B2 | 12/2018 | Curotto |
| 10,196,205 B2 * | 2/2019 | Betz, II ............ B65F 3/208 |
| D843,281 S | 3/2019 | Gander et al. |
| 10,351,340 B2 | 7/2019 | Haddick et al. |
| 10,407,242 B2 | 9/2019 | Rimsa |
| 10,414,067 B2 | 9/2019 | Datema et al. |
| 10,414,266 B1 | 9/2019 | Wiegand et al. |
| 10,456,610 B1 | 10/2019 | Betz et al. |
| 10,457,533 B2 | 10/2019 | Puszkiewicz et al. |
| D869,332 S | 12/2019 | Gander et al. |
| D871,283 S | 12/2019 | Gander et al. |
| 10,513,392 B2 | 12/2019 | Haddick et al. |
| 10,556,622 B1 | 2/2020 | Calliari et al. |
| 10,558,234 B2 | 2/2020 | Kuriakose et al. |
| 10,611,204 B1 | 4/2020 | Zhang et al. |
| 10,632,805 B1 * | 4/2020 | Rositch ............ B60G 15/12 |
| 10,647,025 B2 | 5/2020 | Fox et al. |
| D888,629 S | 6/2020 | Gander et al. |
| 10,758,759 B2 * | 9/2020 | Shively ............ A62C 37/04 |
| 10,974,724 B1 * | 4/2021 | Shively ............ B60K 6/365 |
| 11,097,617 B2 | 8/2021 | Rocholl et al. |
| 2002/0014754 A1 | 2/2002 | Konop |
| 2002/0065594 A1 | 5/2002 | Squires et al. |
| 2002/0103580 A1 | 8/2002 | Yakes et al. |
| 2002/0112851 A1 | 8/2002 | O'Donnell |
| 2003/0091417 A1 | 5/2003 | Swann |
| 2003/0130765 A1 | 7/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0200015 A1 | 10/2003 | Pillar |
| 2003/0205422 A1 | 11/2003 | Morrow et al. |
| 2004/0004346 A1 | 1/2004 | Humphries |
| 2004/0019414 A1 | 1/2004 | Pillar et al. |
| 2004/0024502 A1 | 2/2004 | Squires et al. |

(56) References Cited

U.S. PATENT DOCUMENTS

| | | |
|---|---|---|
| 2004/0039510 A1 | 2/2004 | Archer et al. |
| 2004/0069865 A1 | 4/2004 | Rowe et al. |
| 2004/0133332 A1 | 7/2004 | Yakes et al. |
| 2005/0080520 A1 | 4/2005 | Kline et al. |
| 2005/0109549 A1 | 5/2005 | Morrow |
| 2005/0113988 A1 | 5/2005 | Nasr et al. |
| 2005/0114007 A1 | 5/2005 | Pillar et al. |
| 2005/0119806 A1 | 6/2005 | Nasr et al. |
| 2005/0209747 A1 | 9/2005 | Yakes et al. |
| 2005/0234622 A1 | 10/2005 | Pillar et al. |
| 2005/0285365 A1 | 12/2005 | Manser et al. |
| 2006/0065451 A1 | 3/2006 | Morrow et al. |
| 2006/0065453 A1 | 3/2006 | Morrow et al. |
| 2006/0066109 A1 | 3/2006 | Nasr |
| 2006/0070776 A1 | 4/2006 | Morrow et al. |
| 2006/0070788 A1 | 4/2006 | Schimke |
| 2006/0071466 A1 | 4/2006 | Rowe et al. |
| 2006/0071645 A1 | 4/2006 | Bolton |
| 2006/0106521 A1 | 5/2006 | Nasr et al. |
| 2006/0280582 A1 | 12/2006 | Kouri |
| 2007/0061054 A1 | 3/2007 | Rowe et al. |
| 2007/0088469 A1 | 4/2007 | Schmiedel et al. |
| 2007/0173987 A1 | 7/2007 | Rowe et al. |
| 2007/0185625 A1 | 8/2007 | Pillar et al. |
| 2007/0288131 A1 | 12/2007 | Yakes et al. |
| 2007/0291130 A1 | 12/2007 | Broggi et al. |
| 2007/0292249 A1 | 12/2007 | Wilson |
| 2008/0004777 A1 | 1/2008 | Quigley |
| 2008/0012280 A1 | 1/2008 | Humphries |
| 2008/0059014 A1 | 3/2008 | Nasr et al. |
| 2008/0065285 A1 | 3/2008 | Yakes et al. |
| 2008/0071438 A1 | 3/2008 | Nasr et al. |
| 2008/0114513 A1 | 5/2008 | Pillar et al. |
| 2008/0150350 A1 | 6/2008 | Morrow et al. |
| 2008/0215190 A1 | 9/2008 | Pillar et al. |
| 2008/0221754 A1 | 9/2008 | Rowe et al. |
| 2009/0015716 A1 | 1/2009 | Doedens |
| 2009/0018716 A1 | 1/2009 | Ambrosio |
| 2009/0079839 A1 | 3/2009 | Fischer et al. |
| 2009/0127010 A1 | 5/2009 | Morrow et al. |
| 2009/0194347 A1 | 8/2009 | Morrow et al. |
| 2009/0205885 A1 | 8/2009 | Strong |
| 2010/0116569 A1 | 5/2010 | Morrow et al. |
| 2010/0183410 A1 | 7/2010 | Curotto |
| 2010/0281654 A1 | 11/2010 | Curotto |
| 2010/0301668 A1 | 12/2010 | Yakes et al. |
| 2011/0312459 A1 | 12/2011 | Morrow et al. |
| 2012/0143430 A1 | 6/2012 | Broggi et al. |
| 2013/0196806 A1 | 8/2013 | Morrow et al. |
| 2014/0020415 A1 | 1/2014 | Heyl |
| 2014/0257621 A1 | 9/2014 | Zych |
| 2014/0291045 A1 | 10/2014 | Collett et al. |
| 2015/0093220 A1 | 4/2015 | Parker |
| 2015/0159564 A1 | 6/2015 | Wildgrube et al. |
| 2015/0165871 A1 | 6/2015 | Miller et al. |
| 2015/0283894 A1 | 10/2015 | Morrow et al. |
| 2015/0321546 A1 | 11/2015 | Oue et al. |
| 2016/0001765 A1 | 1/2016 | Shukla et al. |
| 2016/0023548 A1* | 1/2016 | Crist ................ B65F 3/00 180/271 |
| 2016/0059690 A1 | 3/2016 | Wildgrube |
| 2016/0152188 A1 | 6/2016 | Handschke et al. |
| 2016/0297417 A1 | 10/2016 | Shukla et al. |
| 2016/0304041 A1 | 10/2016 | Lennevi et al. |
| 2016/0361987 A1 | 12/2016 | Morrow et al. |
| 2017/0008507 A1 | 1/2017 | Shukla et al. |
| 2017/0036628 A1 | 2/2017 | Nelson et al. |
| 2017/0121108 A1 | 5/2017 | Davis et al. |
| 2017/0158050 A1 | 6/2017 | Crist et al. |
| 2017/0247186 A1 | 8/2017 | Whitfield et al. |
| 2017/0253221 A1 | 9/2017 | Verhoff et al. |
| 2017/0341860 A1 | 11/2017 | Dodds et al. |
| 2017/0349373 A1 | 12/2017 | Gentry et al. |
| 2017/0349374 A1 | 12/2017 | Haddick et al. |
| 2017/0361491 A1 | 12/2017 | Datema et al. |
| 2017/0361492 A1 | 12/2017 | Datema et al. |
| 2018/0072303 A1 | 3/2018 | Shukla et al. |
| 2018/0215354 A1 | 8/2018 | Linsmeier et al. |
| 2018/0250847 A1 | 9/2018 | Wurtz et al. |
| 2018/0327183 A1 | 11/2018 | Peek et al. |
| 2018/0334324 A1 | 11/2018 | Haddick et al. |
| 2018/0345783 A1 | 12/2018 | Morrow et al. |
| 2019/0039407 A1 | 2/2019 | Smith |
| 2019/0047413 A1 | 2/2019 | Crist et al. |
| 2019/0091890 A1 | 3/2019 | Rocholl et al. |
| 2019/0118721 A1 | 4/2019 | Handschke et al. |
| 2019/0121353 A1 | 4/2019 | Datema et al. |
| 2019/0137324 A1* | 5/2019 | Curotto ................ B65F 1/1484 |
| 2019/0185077 A1 | 6/2019 | Smith et al. |
| 2019/0193934 A1 | 6/2019 | Rocholl et al. |
| 2019/0270587 A1 | 9/2019 | Haddick et al. |
| 2019/0291711 A1 | 9/2019 | Shukla et al. |
| 2019/0292975 A1 | 9/2019 | Hou et al. |
| 2019/0299791 A1* | 10/2019 | Gonze ................ H01M 10/66 |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0351758 A1 | 11/2019 | Wiegand et al. |
| 2019/0351883 A1 | 11/2019 | Verhoff et al. |
| 2019/0359184 A1 | 11/2019 | Linsmeier et al. |
| 2019/0360600 A1 | 11/2019 | Jax et al. |
| 2019/0381990 A1 | 12/2019 | Shukla et al. |
| 2020/0031641 A1 | 1/2020 | Puszkiewicz et al. |
| 2020/0038700 A1 | 2/2020 | Betz et al. |
| 2020/0039341 A1 | 2/2020 | Morrow et al. |
| 2020/0047586 A1* | 2/2020 | Gonze ................ B60H 1/3227 |
| 2020/0078986 A1 | 3/2020 | Clifton et al. |
| 2020/0087063 A1 | 3/2020 | Haddick et al. |
| 2020/0102145 A1 | 4/2020 | Nelson et al. |
| 2020/0130746 A1 | 4/2020 | Calliari et al. |
| 2020/0230841 A1 | 7/2020 | Datema et al. |
| 2020/0230842 A1 | 7/2020 | Datema et al. |
| 2020/0231035 A1 | 7/2020 | Crist et al. |
| 2020/0262366 A1 | 8/2020 | Wildgrube et al. |
| 2020/0265656 A1 | 8/2020 | Koga et al. |
| 2020/0290236 A1* | 9/2020 | Bjornstad ............ B28C 5/4206 |
| 2020/0290237 A1* | 9/2020 | Steffens ................ B60P 3/16 |
| 2021/0253347 A1* | 8/2021 | Pung ................ B65F 3/10 |

OTHER PUBLICATIONS

U.S. Appl. No. 17/007,236, filed Aug. 31, 2020, Oshkosh Corporation.

* cited by examiner

REFUSE VEHICLE WITH RANGE EXTENSION

CROSS-REFERENCE TO RELATED PATENT APPLICATIONS

This application is a continuation-in-part of U.S. application Ser. No. 17/221,255, filed Apr. 2, 2021, which is a continuation of U.S. application Ser. No. 17/007,605, filed Aug. 31, 2020, which is a continuation of U.S. application Ser. No. 16/943,295, filed Jul. 30, 2020, which claims the benefit of and priority to U.S. Provisional Patent Application No. 62/881,089, filed Jul. 31, 2019, all of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment of the present disclosure relates to a refuse vehicle. The refuse vehicle includes tractive elements, a prime mover, accessories, and a range extension system. The prime mover is configured to generate mechanical energy to drive one or more of the tractive elements. The accessories are configured to consume electrical energy to perform functions. The range extension system includes a battery, and a controller. The battery is configured to provide electrical energy for the accessories. The controller is configured to obtain a state of charge of the battery, and limit operation of at least one of the accessories in response to the state of charge of the battery to extend a transportation range of the refuse vehicle.

Another embodiment relates to a range extension system for a refuse vehicle. The range extension system includes a battery, and a controller. The battery is configured to provide electrical energy for accessories of the refuse vehicle. The controller is configured to obtain a state of charge of the battery and limit operation of at least one of the accessories in response to the state of charge of the battery to extend a transportation range of the refuse vehicle.

Another embodiment of the present disclosure relates to a method for increasing a transportation range of a refuse vehicle. The method includes operating accessories of the refuse vehicle using energy provided by an electrical storage system (ESS). The method also includes obtaining a state of charge of the ESS, and in response to the state of charge of the ESS indicating an insufficient amount of energy is available, at least one of (i) limiting operation of at least one accessory of the refuse vehicle, or (ii) activating a supplemental energy source to charge the ESS. Limiting operation of at least one accessory of the refuse vehicle or activating the supplemental energy source increases the transportation range of the refuse vehicle. The method also includes, in response to the state of charge of the ESS indicating that a sufficient amount of energy is available, continuing to operate the accessories of the refuse vehicle using energy provided by the ESS without limiting operation of any of the accessories and without activating the supplemental energy source.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
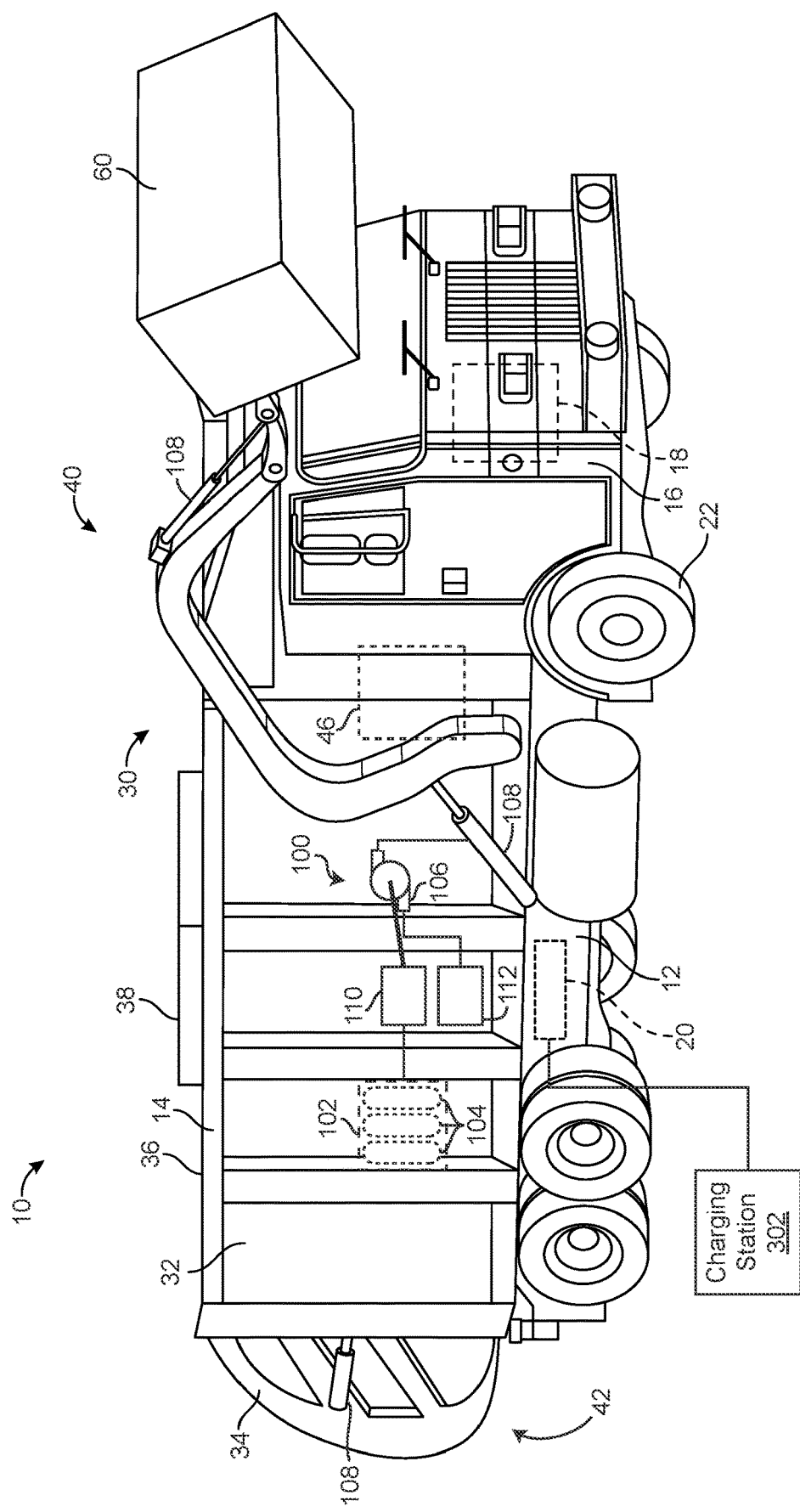
FIG. 1 is a perspective view of a refuse vehicle including an independent accessory system, according to an exemplary embodiment.

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a refuse vehicle includes a prime mover configured to drive the refuse vehicle for transportation. The refuse vehicle may include tractive elements (e.g., wheels) that are configured to be driven by the prime mover to transport the refuse vehicle from location to location. The prime mover can be an electric motor, a compressed natural gas (CNG) engine, an internal combustion engine (e.g., a diesel engine, a gasoline engine, etc.), or any combination thereof. For example, the refuse vehicle may be a hybrid refuse vehicle that includes both an electric motor and an internal combustion engine.

The refuse vehicle also includes an independent accessory system that is configured to operate various body functions of the refuse vehicle. For example, the independent accessory system can be configured to operate lift arms, a packer apparatus, a tailgate, lifting/dumping apparatuses, etc., of the refuse vehicle. The independent accessory system can include one or more fuel tanks (e.g., pressure vessels) that store fuel (e.g., CNG fuel, diesel fuel, gasoline fuel, etc.) for use by an engine (e.g., an internal combustion engine). The fuel may be stored in the one or more fuel tanks as a liquid fuel, a gaseous fuel, or a combination thereof (e.g., a saturated fuel). The engine may be configured to fluidly couple with the fuel tanks to receive fuel from the tanks, combust the fuel, and drive a hydraulic pump. The hydraulic pump can draw or recirculate hydraulic fluid from a reservoir and provide the hydraulic fluid to one or more hydraulic cylinders. The hydraulic cylinders can be operated to perform various body functions (e.g., by extending and/or retracting).

The independent accessory system can be operated by a user through a human machine interface (HMI) and a controller. The controller may receive user inputs from the HMI and generate control signals for the engine and/or the hydraulic pump to perform requested operations of the body functions. The engine and the hydraulic pump may be sized according to requirements of the various body functions. For example, a compaction apparatus that compacts, crushes, compresses, or otherwise packs refuse may require a larger hydraulic cylinder, hydraulic pump, and engine. Likewise, a smaller hydraulic cylinder, hydraulic pump, and engine may be suitable for lift arms for small refuse collection bins.

In some embodiments, one or more of the components of the independent accessory system are positioned within a modular unit (e.g., a modular add-on unit, an accessory power unit, etc.). The modular unit can be removably coupled with the refuse vehicle. The modular unit can include the engine, the hydraulic pump, a reservoir for the hydraulic pump, etc. In some embodiments, the modular unit is configured to fluidly couple with the fuel tanks to receive the fuel from the fuel tanks. The modular unit can be removably and/or fixedly coupled anywhere on the refuse vehicle, and may be fluidly coupled with the fuel tanks.

The prime mover of the refuse vehicle may be an electric motor. If the prime mover is an electric motor, the refuse vehicle may include a battery system having battery cells. The battery cells may store electrical energy (e.g., in the form of chemical energy) and provide the electrical energy to the electric motor for transportation. The battery system can be configured to removably electrically couple with a charging station that may be located at jobsites, along a route of the refuse vehicle, at charging locations, at a fleet management location (e.g., a home base), etc. The charging station can include an engine, a generator, and fuel tanks. The fuel tanks can provide the engine with fuel. The engine combusts the fuel and drives the generator (e.g., through a shaft). The generator then charges the batteries with electrical power/electrical energy that can be used to transport the refuse vehicle.

Overall Vehicle

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes an electric motor, a CNG engine, a hybrid engine, an internal combustion engine, a diesel engine, a gasoline engine, etc., shown as prime mover 18, and an energy storage system, shown as battery system 20. In some embodiments, the prime mover is or includes an internal combustion engine. For example, the prime mover may be a diesel engine, a gasoline engine, a CNG engine, etc. According to the exemplary embodiment shown in FIG. 1, the prime mover 18 is coupled to the frame 12 at a position beneath the cab 16. The prime mover 18 is configured to provide power to a plurality of tractive elements, shown as wheels 22 (e.g., via a drive shaft, axles, etc.). In other embodiments, the prime mover 18 is otherwise positioned and/or the refuse vehicle 10 includes a plurality of electric motors to facilitate independently driving one or more of the wheels 22. In still other embodiments, the prime mover 18 or a secondary electric motor is coupled to and configured to drive a hydraulic system that powers hydraulic actuators. According to the exemplary embodiment shown in FIG. 1, the battery system 20 is coupled to the frame 12 beneath the body 14. In other embodiments, the battery system 20 is otherwise positioned (e.g., within a tailgate of the refuse vehicle 10, beneath the cab 16, along the top of the body 14, within the body 14, etc.).

According to an exemplary embodiment, the battery system 20 is configured to provide electric power to (i) the prime mover 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). In some embodiments, the refuse vehicle 10 includes an internal combustion generator that utilizes one or more fuels (e.g., gasoline, diesel, propane, natural gas, hydrogen, etc.) to generate electricity to charge the battery system 20, power the prime mover 18, power the electric actuators, and/or power the other electrically operated accessories (e.g., a hybrid refuse vehicle, etc.). For example, the refuse vehicle 10 may have an internal combustion engine augmented by the prime mover 18 to cooperatively provide power to the wheels 22. The battery system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume by a compacting apparatus 46. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.), shown as hydraulic cylinders 108, to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Accessory Power System

Referring still to FIG. 1, the refuse vehicle 10 also includes an independent accessory system 100 (e.g., a CNG powered accessory system, a diesel powered accessory system, etc.), according to an exemplary embodiment. The independent accessory system 100 can be configured to drive, move, provide mechanical energy for, etc., or otherwise operate various body functions of refuse vehicle 10 independently of an operation of prime mover 18. For example, the independent accessory system 100 can be configured to drive or operate the lift assembly 40, a tailgate lift assembly 42, etc., or any other body function, lift apparatus, auxiliary apparatus, etc., of the refuse vehicle 10. In some embodiments, the independent accessory system 100 is configured to operate a hydraulic cylinder 108 of any of the lift apparatuses, auxiliary apparatuses, etc. The independent accessory system 100 may be configured to operate independently of the prime mover (e.g., prime mover 18) of the refuse vehicle 10. In some embodiments, the independent accessory system 100 can operate to drive the hydraulic cylinders 108 without requiring operation of the prime mover 18. For example, the independent accessory system 100 can independently provide mechanical energy for the various body functions 114 of the refuse vehicle 10, without requiring operation of or mechanical energy from the prime mover 18 (e.g., even if prime mover 18 is shut-off or inoperational, or in an idle mode). In some embodiments, the independent accessory system 100 and operation of the prime mover 18 are linked (e.g., linked in a control scheme). However, if operation of the independent accessory system 100 and the prime mover 18 are linked in a control scheme, the independent accessory system 100 and the prime mover 18 (e.g., the prime mover of the refuse vehicle 10) may still be able to provide mechanical energy for their respective functions (e.g., operation of the body functions 114 and transportation of the refuse vehicle 10, respectively) independent of the operation of each other.

The body functions can include operation of lift arms (e.g., front loading lift arms, side loading lift arms, rear loading lift arms), tailgates, dumping operations, packing operations, etc., of the refuse vehicle 10. The refuse vehicle 10 can include various hydraulic cylinders 108 configured to perform any of the body functions described herein. For example, the refuse vehicle 10 can include the compacting apparatus 46 that is configured to pack, crush, compact, compress, etc., refuse that is loaded into the hopper or the body 14 using the hydraulic cylinders 108. The independent accessory system 100 can be configured to operate any of the hydraulic cylinders 108 to perform the various body functions in response to user inputs. The independent accessory system 100 can be configured to perform the various body functions independently of each other, or in conjunction with each other.

Figure 2:
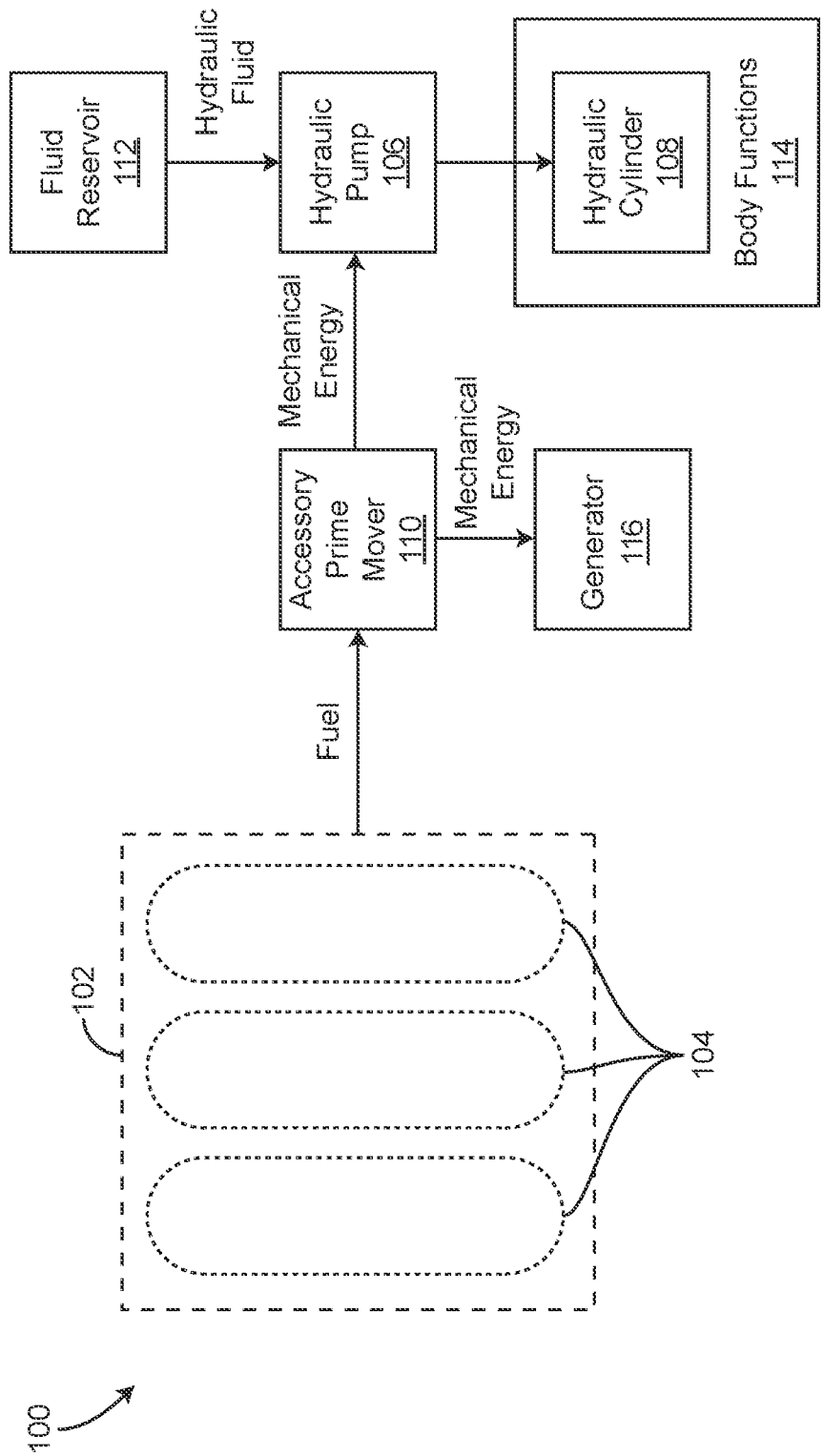
FIG. 2 is a block diagram of the independent accessory system of the refuse vehicle of FIG. 1, according to an exemplary embodiment.
Figure 5:
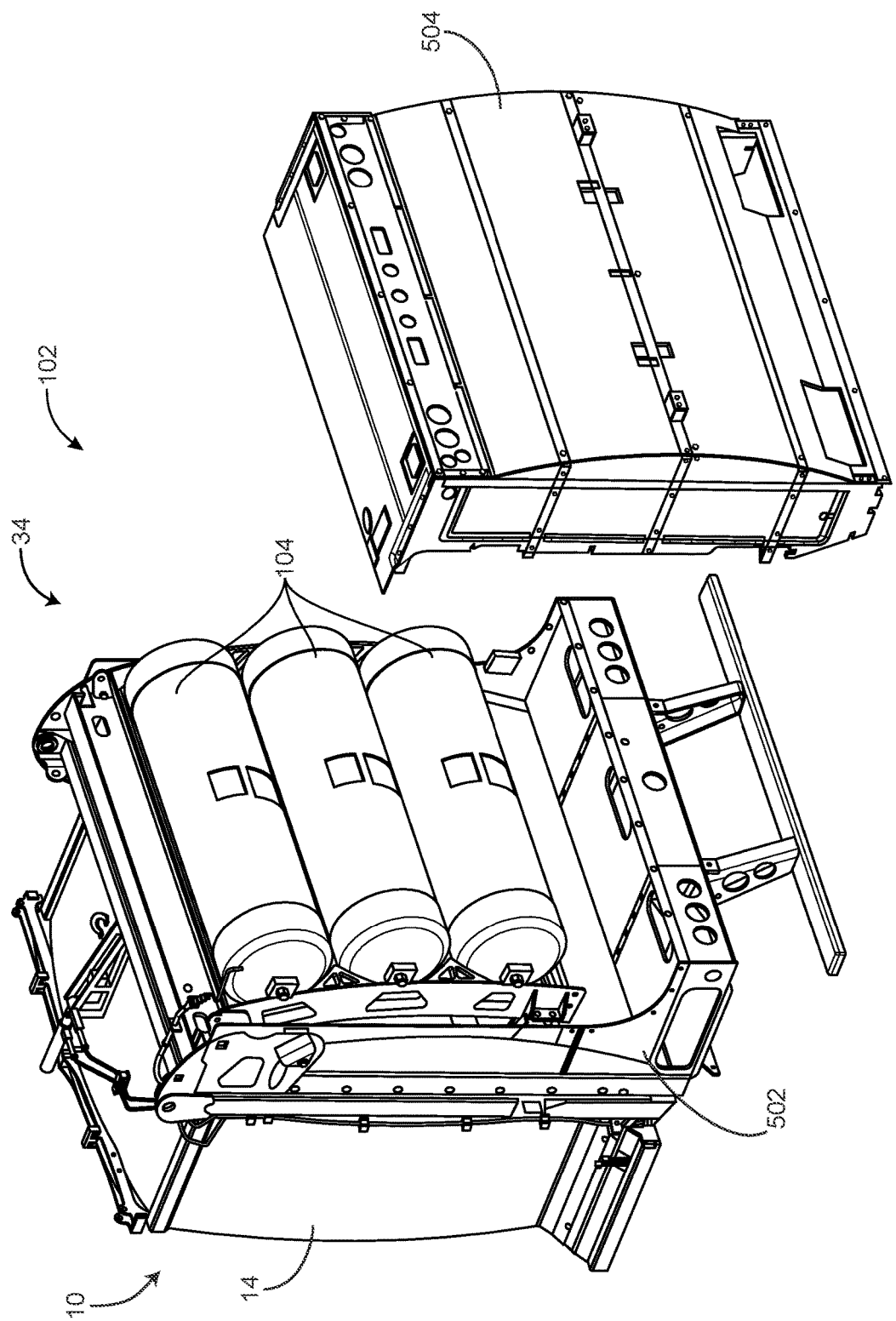
FIG. 5 is a perspective view of a support structure for fuel tanks of the independent accessory system of the refuse vehicle of FIG. 1, according to an exemplary embodiment.

Referring to FIGS. 1 and 2, the independent accessory system 100 includes one or more tanks, capsules, containers, pressure vessels, cartridges, etc., shown as fuel tanks 104 (e.g., CNG tanks, diesel fuel tanks, gasoline tanks, etc.). The fuel tanks 104 are supported, fixedly coupled, fixed, connected, etc., or otherwise coupled with a support unit, a mount unit, a structure, etc., shown as support structure 102 of the refuse vehicle 10. In some embodiments, the fuel tanks 104 are positioned within the tailgate 34 (e.g., as shown in FIG. 5, described in greater detail below). For example, the fuel tanks 104 and the support structure 102 can be disposed within an inner volume of the tailgate 34.

The independent accessory system 100 also includes an internal combustion engine, a CNG engine, a diesel engine, a fuel cell, a hydrogen engine, an electric motor, etc., shown as accessory prime mover 110. The accessory prime mover 110 is configured to receive fuel (e.g., diesel fuel, gasoline, CNG, hydrogen, electrical energy, a resource, etc.) from the fuel tanks 104 through a piping system, a plumbing system, one or more pipes, etc. The piping system can include various tubular members, pipes, hoses, valves, connectors, etc., that fluidly couple with the tank 112 and the accessory prime mover 110 such that fuel can be provided from the tank 112 to the accessory prime mover 110. The accessory prime mover 110 can use the fuel (e.g., combust the fuel) to produce mechanical energy. The mechanical energy is output by the accessory prime mover 110 to a pump 106. The pump 106 can be driven by the accessory prime mover 110 and draw hydraulic fluid from a fluid reservoir, a tank, etc., shown as tank 112. The tank 112 is coupled with (e.g., fixedly coupled, attached, mounted, etc.) with the refuse vehicle 10. The tank 112 can be fixedly coupled with the body 14. The pump 106 outputs the hydraulic fluid to the hydraulic cylinders 108 to operate the hydraulic cylinders 108 to perform the body functions 114.

In some embodiments, the accessory prime mover 110 is a smaller engine than the prime mover 18. The accessory prime mover 110 and the hydraulic pump 106 can be sized according to requirements of the various body functions. Other refuse vehicles use the prime mover 18 to drive the body functions. However, this may be inefficient, since the prime mover 18 is sized to transport the refuse vehicle 10 (e.g., to provide torque to the wheels 22) and may be oversized for the body functions. Using a smaller engine (e.g., the accessory prime mover 110) with a correspondingly sized hydraulic pump 106 facilitates a more efficient and robust refuse vehicle, which does not use an oversized prime mover 18 for body functions.

Advantageously, the independent accessory system 100 can use pre-existing infrastructure of the refuse vehicle 10. For example, CNG-powered refuse vehicles (e.g., refuse vehicles that use a CNG engine as the prime mover for transportation purposes) may already include a support structure and fuel tanks that can be used by the accessory prime mover 110/hydraulic pump 106 for the body functions.

Accessory Power Unit

Figure 6:
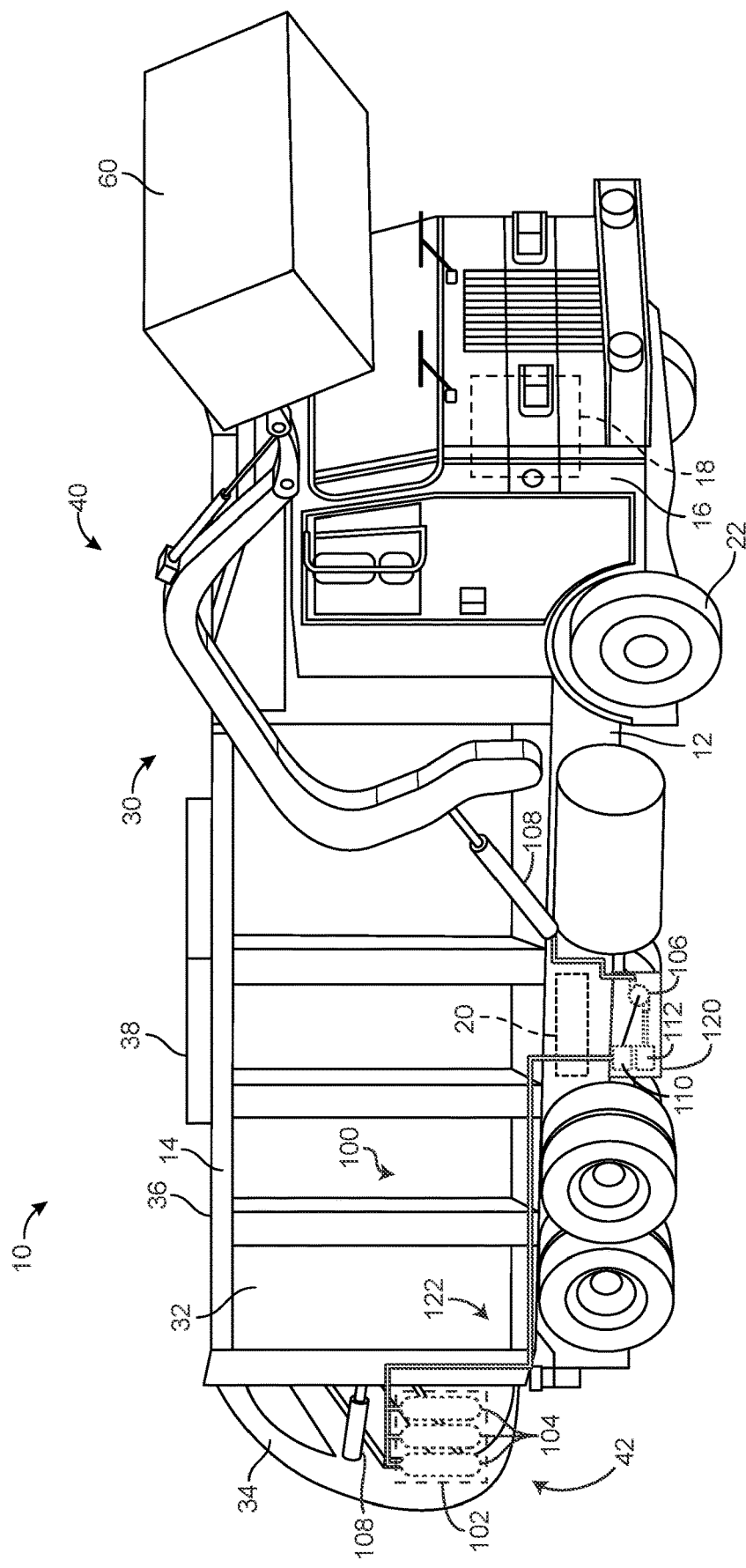
FIG. 6 is a perspective view of the refuse vehicle of FIG. 1, with an accessory power unit that contains some of the components of the independent accessory system of FIG. 1, according to an exemplary embodiment.

Referring particularly to FIG. 6, one or more portions of the independent accessory system 100 can be contained in, enclosed in, supported by, etc., a modular unit, an add-on unit, a removable unit, etc., shown as accessory power unit (APU) 120. The APU 120 can be configured to integrate with existing infrastructure (e.g., CNG infrastructure) of the refuse vehicle 10 to operate or drive the various body functions of the refuse vehicle 10. The refuse vehicle 10 can be configured as a front loading refuse vehicle, a side loading refuse vehicle, a rear loading refuse vehicle, etc. It should be understood that while the inventive concepts described herein reference a refuse vehicle, it is contemplated that the APU 120 and/or the various components of the independent accessory system 100 are also applicable to various other types of vehicles that include body functions. For example, the independent accessory system 100 and/or the APU 120 can be used on a fire truck, a commercial truck, a heavy-duty truck, etc., or any vehicle that has body functions to be operated independently of the transportation of the vehicle.

The APU 120 can be removably coupled with the refuse vehicle 10 on an underside of the body 14. For example, the APU 120 can be fixedly and removably coupled with the frame 12 beneath the body 14. The APU 120 can be fixedly and removably coupled at a front of the frame 12, at a rear end of the frame 12, centrally along the frame 12, etc. In other embodiments, the APU 120 can be fixedly and removably coupled with a side of the body 14, within the body 14, within a compartment of the body 14, on top of the body 14, etc. The APU 120 can be positioned anywhere about the body 14 or anywhere on the refuse vehicle 10 that provides sufficient structural strength (e.g., along the frame 12, near a chassis of the refuse vehicle 10, etc.).

The APU 120 includes the accessory prime mover 110, the tank 112, and the hydraulic pump 106, according to an exemplary embodiment. The APU 120 can be a hollow container that protects the various internal components (e.g., the accessory prime mover 110, the tank 112, the hydraulic pump 106, etc.) and removably couples with the refuse vehicle 10. The accessory prime mover 110 of the APU 120 fluidly couples with the fuel tanks 104 through a plumbing system, a piping system, etc., shown as tubular system 122. The tubular system 122 includes various tubular members that fluidly couple the fuel tanks 104 with the accessory prime mover 110. The accessory prime mover 110 receives the fuel from the fuel tanks 104 through the tubular system 122, combusts the fuel, and drives the hydraulic pump 106. The hydraulic pump 106 then drives the hydraulic cylinder(s) 108 of the various body functions of the refuse vehicle 10 (e.g., through various tubular members, pipes, etc.).

Advantageously, the APU 120 facilitates a versatile refuse vehicle with improved efficiency since the accessory prime mover 110 and the hydraulic pump 106 are sized to serve or drive the various hydraulic cylinders 108. The APU 120 can be installed by a technician, plumbed (e.g., by fluidly coupling the accessory prime mover 110 with the fuel tanks 104 through installation of the tubular system 122), and used to operate the various body functions of the refuse vehicle 10. Advantageously, the various body functions of the refuse vehicle 10 can be operated independently of the prime mover 18. The APU 120 can integrate with existing structure (e.g., existing fuel tanks 104), to thereby convert refuse vehicles to the refuse vehicle 10 described herein.

Control System

Figure 3:
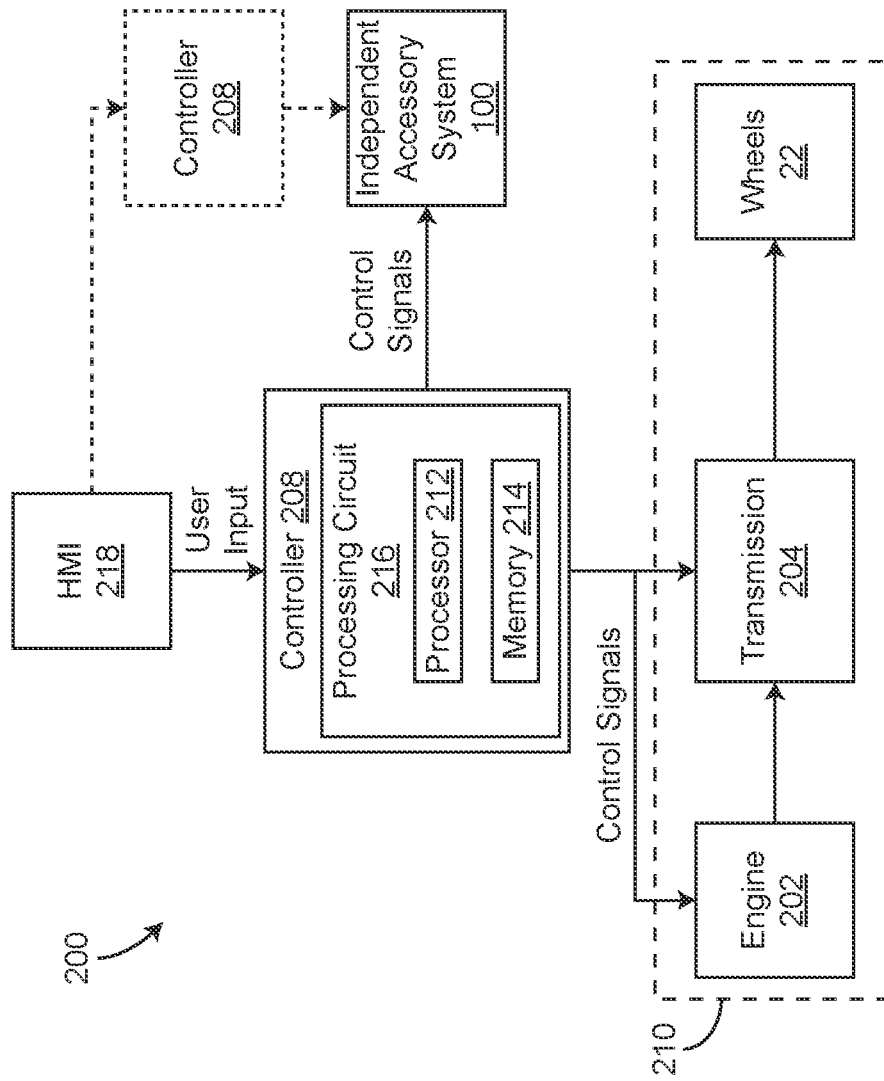
FIG. 3 is a block diagram of a control system of the refuse vehicle of FIG. 1, according to an exemplary embodiment.

Referring particularly to FIG. 3, a control system 200 can be configured to operate the refuse vehicle 10, according to an exemplary embodiment. The control system 200 includes a controller that is configured to generate control signals for a drivetrain, a chassis, etc., of the refuse vehicle 10, shown as drivetrain 210. The drivetrain 210 includes an engine 202, a transmission 204, and wheels 22 of the refuse vehicle 10. The engine 202 may be the prime mover 18 of the refuse vehicle 10. The engine 202 can produce mechanical energy and output the mechanical energy to the transmission 204. The transmission 204 receives the mechanical energy from the engine 202 and outputs mechanical energy (e.g., rotational kinetic energy) to the wheels 22 (e.g., at a higher torque than the mechanical energy input by the engine 202).

Control system 200 includes a controller 208 that is configured to generate control signals for the engine 202 and the transmission 204. The controller 208 can include a circuit, shown as processing circuit 216, a processor, shown as processor 212, and memory, shown as memory 214, according to an exemplary embodiment. Controller 208 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The processing circuit 216 of controller 208 may include an ASIC, one or more FPGAs, a DSP, circuits containing one or more processing components, circuitry for supporting a microprocessor, a group of processing components, or other suitable electronic processing components (i.e., processor 212). In some embodiments, the processing circuit 216 is configured to execute computer code stored in memory 214 to facilitate the activities described herein.

Memory 214 may be any volatile or non-volatile computer-readable storage medium capable of storing data or computer code relating to the activities described herein. According to an exemplary embodiment, memory 214 includes computer code modules (e.g., executable code, object code, source code, script code, machine code, etc.) configured for execution by the processing circuit 216.

In some embodiments, a single controller 208 is configured to generate control signals for both the drivetrain 210 and the independent accessory system 100. In other embodiments, multiple controllers 208 are configured to generate control signals for independent accessory system 100 and drivetrain 210 independently of each other. For example, a first controller 208 can be configured to provide control signals to engine 202 and/or transmission 204 of drivetrain 210, while a second controller 208 can be configured to provide control signals for independent accessory system 100. The first and second controllers 208 can be configured to receive user inputs from a human machine interface (HMI) or a user interface, shown as HMI 218. In some embodiments, the first and second controllers 208 are configured to receive user inputs from separate HMIs 218. The HMIs 218 can be positioned within the cab 16 or near the associated body functions (e.g., near lift assembly 40). For example, the HMI 218 that controls the operation of the drivetrain 210 can be disposed within the cab 16, while the HMI 218 that controls the operation of the lift assembly 40 can be positioned on the body 14 near the lift assembly 40.

Charging System

Figure 4:
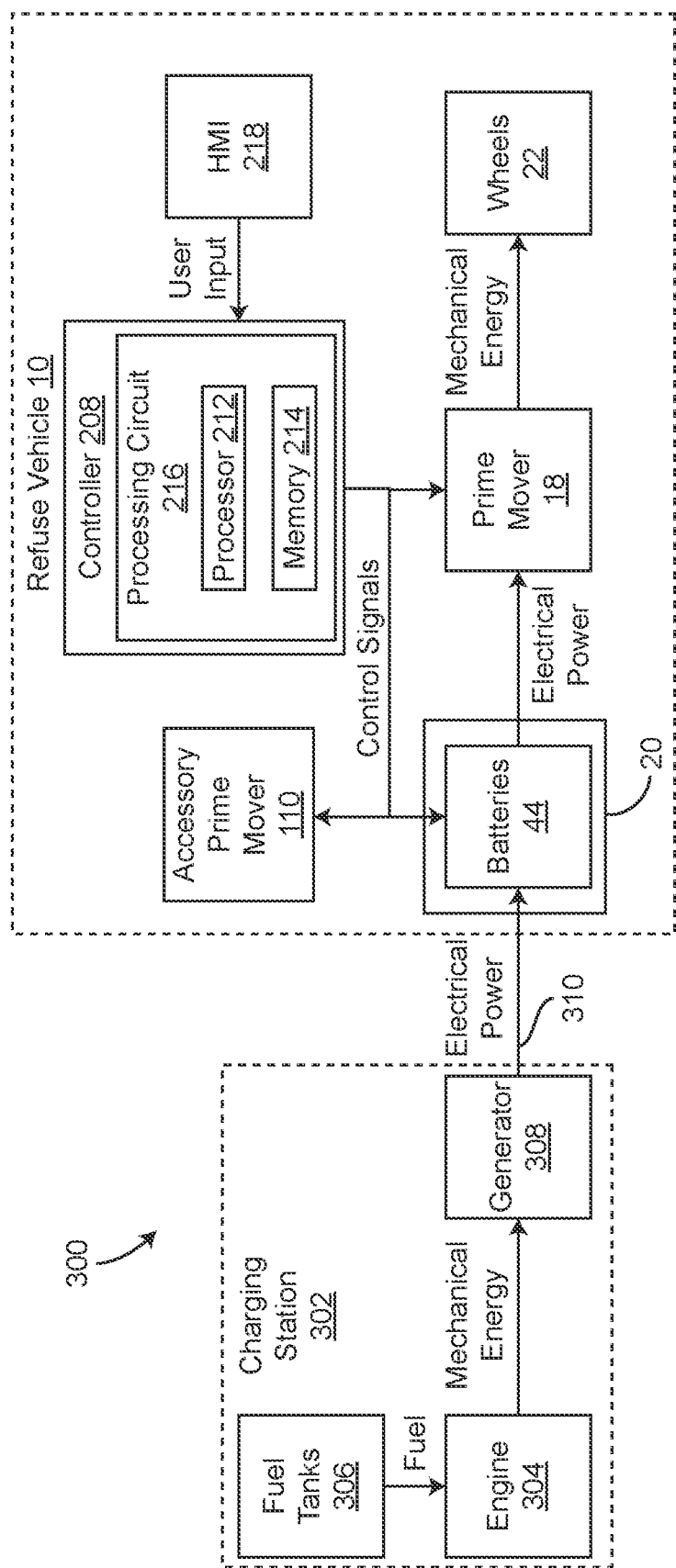
FIG. 4 is a block diagram of a charging system for the refuse vehicle of FIG. 1, according to an exemplary embodiment.

Referring particularly to FIG. 4, a charging system 300 can be used to re-charge batteries 44 of the battery system 20, according to an exemplary embodiment. The charging system 300 includes a charging station 302 that can be positioned at a fleet management site, at a job site, along the refuse vehicle's route, etc. The charging station 302 includes one or more fuel tanks 306, an engine 304, and a generator 308. The fuel tanks 306 can be the same as or similar to the fuel tanks 104 on the refuse vehicle 10. Likewise, the engine 304 can be similar to the accessory prime mover 110 on the refuse vehicle 10.

The refuse vehicle 10 includes controller 208 that is configured to generate and provide control signals for prime mover 18 (e.g., an electric motor) and/or accessory prime mover 110. The controller 208 can be configured to receive user inputs from HMI 218 and generate the control signals for the prime mover 18 and/or the accessory prime mover 110 based on the user inputs. In some embodiments, the controller 208 generates control signals to operate the prime mover 18 and/or the accessory prime mover 110 to perform operations requested by the user through HMI 218.

The refuse vehicle 10 can be driven by an electric motor, an engine (e.g., engine 202), or a hybrid engine-electric motor. In this way, the refuse vehicle may be an electrically driven refuse vehicle, an internal-combustion engine driven vehicle, or a hybrid vehicle. For example, the refuse vehicle 10 can include a plurality of prime movers. One or more of the prime movers can be electric motors (e.g., the prime mover 18) and/or internal combustion engines (e.g., the engine 202). The electric motors used to transport the refuse vehicle 10 are supplied with power by batteries 44 of the battery system 20.

The batteries 44 can be removable and/or replaceable battery cells. For example, the batteries 44 can be charged at a fleet management site in a charging rack, then installed into the refuse vehicle 10. The batteries 44 can be later removed (e.g., after a state of charge of the batteries 44 has been depleted) and replaced with new or fresh batteries (e.g., that may be stored on the refuse vehicle 10).

The operator of the refuse vehicle 10 may arrive at a job site, or at a fleet management location and electrically couple the charging station 302 with the batteries 44. Since some refuse vehicles operate using CNG, the charging station 302 may use pre-existing fuel tanks 306 at the fleet management location that store CNG. In some embodiments, the engine 304 and the generator 308 are packaged in a unit that is configured to fluidly couple with the fuel tanks 306. In some embodiments, the fuel tanks 306 are removably fluidly coupled with the engine 304. In this way, the fuel tanks 306 can be used for replenishing the fuel tanks 104 on the refuse vehicle 10 and/or for charging batteries 44 of the refuse vehicle 10. The generator 308 can be any mechanical transducer capable of receiving mechanical energy (e.g., rotational kinetic energy) and generating electrical energy for the batteries 44. For example, the generator 308 can include a stator and an armature that is driven by the engine 304 to produce electrical current or electrical energy.

Referring again to FIG. 2, the accessory prime mover 110 can be configured to output mechanical energy to a generator 116 to drive generator 116 to generate electrical power. The electrical power is provided to batteries 44 of refuse vehicle 10 to charge the batteries 44. In this way, accessory prime mover 110 can operate independently to drive generator 116 to charge batteries 44 of refuse vehicle 10.

Support Infrastructure

Referring now to FIG. 5, one possible infrastructure of the support structure 102 includes the fuel tanks 104 stored within the tailgate 34. The tailgate 34 can include a first or inner member 502 and a second or outer member 504. The first member 502 is configured to fixedly and/or pivotally couple with the refuse vehicle 10. The first member 502 and the second member 504 can be configured to removably and fixedly couple with each other to define an inner volume. The fuel tanks 104 can be fixedly coupled with the first member 502 and stored within the inner volume defined by the first member 502 and the second member 504. The fuel tanks 104 can be oriented horizontally (as shown in FIG. 5) or vertically. The fuel tanks 104 can be fixedly coupled with the first member 502 at their ends (e.g., with fasteners). In some embodiments, the fuel tanks 104 extend along substantially an entire width of the tailgate 34.

It should be understood that while several configurations of the support structure 102 are described herein, the inventive concepts are not limited to these configurations of the support structure 102. The fuel tanks 104 can be positioned anywhere on the refuse vehicle 10, or in multiple locations. For example, the fuel tanks 104 can be positioned on top of the refuse vehicle 10 (e.g., on top of the body 14), underneath the refuse vehicle 10 (e.g., on an underside of the body 14, on the frame 12 beneath the refuse vehicle 10, etc.), between the cab 16 and the body 14, etc.

Range Extension

Figure 7:
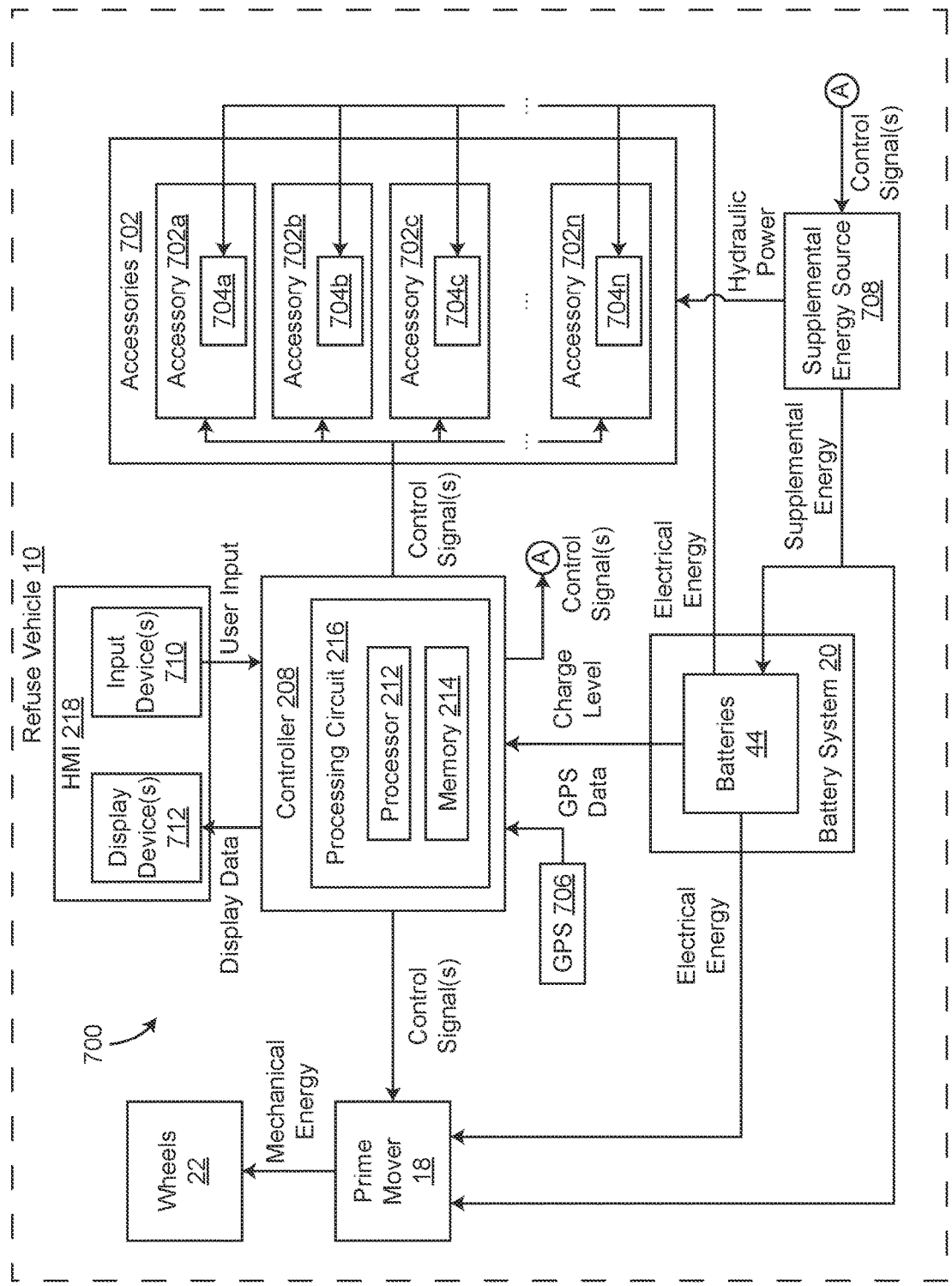
FIG. 7 is a block diagram of a range extension system of the refuse vehicle of FIG. 1, according to an exemplary embodiment.
Figure 8:
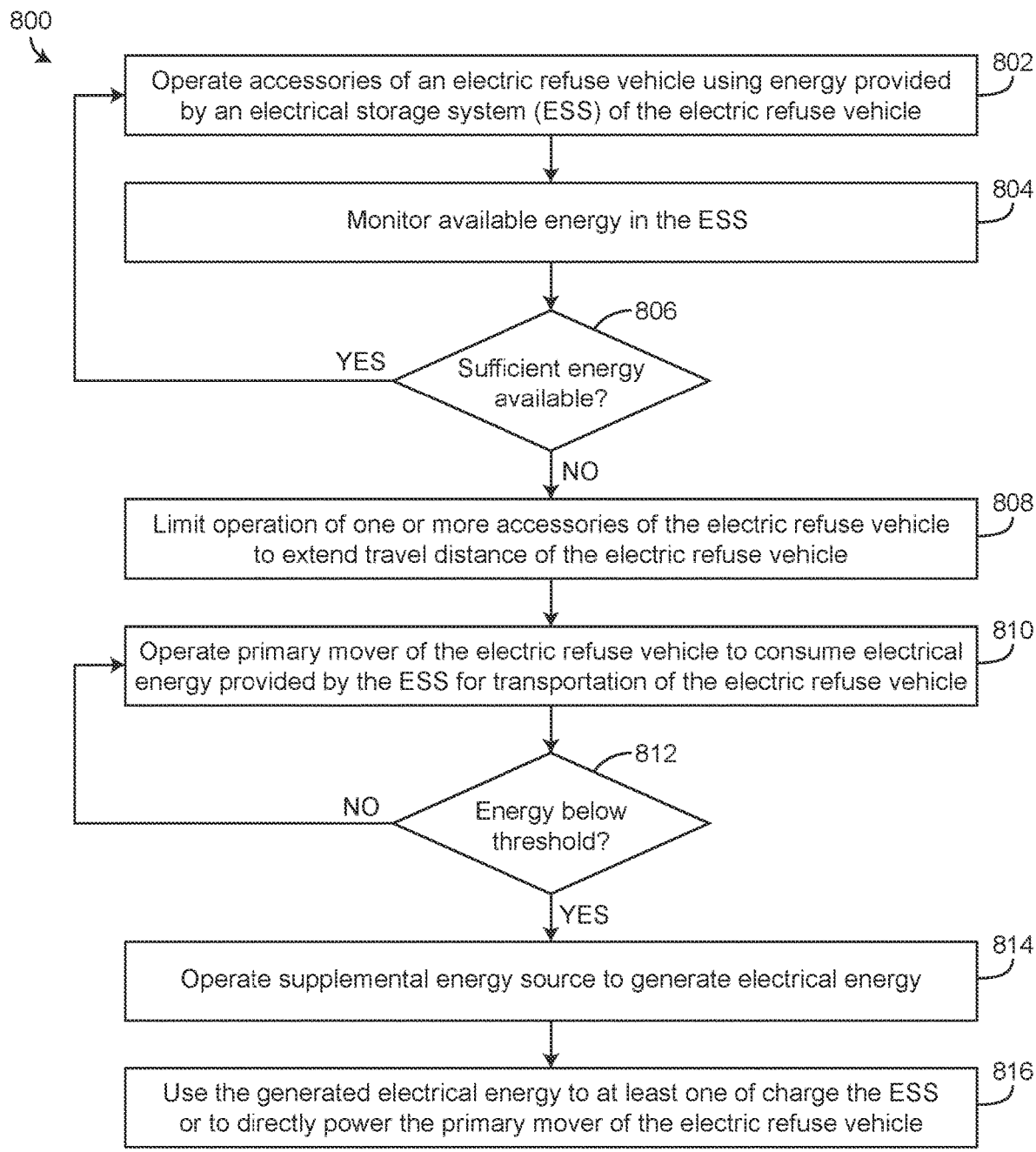
FIG. 8 is a flow diagram of a process for extending range of a refuse vehicle, according to an exemplary embodiment.

Referring to FIGS. 7 and 8, the refuse vehicle 10 or systems thereof are configured to implement range extension to limit operations of various body functions or accessories of the refuse vehicle 10. In an exemplary embodiment, a control system or controller of the refuse vehicle 10 monitors charge level, state of charge, energy level, etc., of the batteries 44 and limits operation of various body functions or accessories of the refuse vehicle 10 (e.g., limiting operation of a compaction apparatus of the refuse vehicle, limiting tailgate operations, etc.) to prolong life of the batteries 44 for transportation of the refuse vehicle 10 (e.g., so that the refuse vehicle 10 can return to a location, finish a route, etc.). In some embodiments, the independent accessory system 100 or components thereof are configured to operate to charge the batteries 44 as required based on state of charge or remaining energy level of the batteries 44.

Referring particularly to FIG. 7, the refuse vehicle 10 includes a range extension system 700 as shown. The range extension system 700 can include the independent accessory system 100 or components thereof (e.g., APU 120). As shown in FIG. 7, the range extension system 700 includes the controller 208, the battery system 20, accessories 702 and a supplemental energy source 708 (e.g., the APU 120). The range extension system 700 can also include the HMI 218 that is configured to provide user inputs to the controller 208 for operation of the refuse vehicle 10, chassis functions, body functions, etc., thereof. The range extension system 700 can also include a global positioning system (GPS) 706 that is configured to provide GPS data (e.g., latitude and longitude, current geographical location/position, etc.) to the controller 208.

The controller 208 is configured to receive data from the battery system 20 or from the batteries 44 of the refuse vehicle 10, that indicates or includes a charge level, an amount of energy in the batteries 44, a remaining amount of power that can be provided or discharged, etc. In some embodiments, the controller 208 is configured to receive the data from the battery system 20 (e.g., a charge level of the batteries 44 as shown), and determine if operation of one or more of the accessories 702 should be limited, restricted, etc., based on the charge level of the batteries 44. In some embodiments, the controller 208 is configured to compare the charge level of the batteries 44 to one or more thresholds and, when the charge level exceeds or decreases below various of the one or more thresholds, limit operation of corresponding one or more accessories 702 of the refuse vehicle 10 (e.g., limit unnecessary body operations). In some embodiments, the controller 208 is a body controller of the refuse vehicle 10, a chassis controller of the refuse vehicle 10, a main controller of the refuse vehicle 10, etc.

As shown in FIG. 7, the refuse vehicle 10 includes accessories 702, shown to include accessory 702a, accessory 702b, accessory 702c, etc., and accessory 702n. It should be understood that the accessories 702 can include any number of accessories 702a . . . 702n. Each of the accessories 702 includes a corresponding electric motor, electric linear actuator, controller, processing circuitry, etc., shown as electrical components 704a . . . 704n. In some embodiments, any of the accessories 702 include multiple electrical components 704. The electrical components 704 may include lights, speakers, alert devices, electric motors, etc., or any other electrical component that consumes electrical energy during operation of the accessories 702. For example, if the accessory 702a is a compaction system, the electrical component 704a of the accessory 702a may be an electric linear actuator or an electric motor that is configured to consume electrical energy (e.g., provided by the battery system 20) and use the electrical energy to drive the compaction apparatus. Similarly, if the accessory 702b is a reach arm or a loading apparatus, the electric components 704b may be a linear electric actuator that consumes electrical energy provided by the battery system 20 and uses the electrical energy to drive the reach arm or loading apparatus to perform various loading operations. In another example, if the accessory 702c is a lighting system (e.g., body lights, headlights, etc.), the electrical components 704c of the accessory 702c may be light emitting diodes (LEDs), etc., that consume electrical energy provided by the battery system 20 and use the electrical energy to provide lighting operations. It should be understood that the accessories 702 can include any body, chassis, cab, accessory, etc., systems, sub-systems, components, etc., including but not limited to body lights, headlights, torque converters, electric transmissions, generators, electric actuators, reach arms, lift apparatuses, tailgate apparatuses, compaction apparatuses, GPS system, driver monitor system, autonomous driving system, camera systems, etc.

Referring still to FIG. 7, the controller 208 is configured to receive a user input from the HMI 218 (e.g., a control input) and operate the accessories 702 based on the user input provided by the HMI 218. In some embodiments, the controller 208 generates the control signals for the accessories 702 based on the user input and provides the control signals to corresponding or appropriate ones of the accessories 702. In some embodiments, the accessories 702 receive the control signals from the controller 208, operate based on the control signals, and consume energy from the battery system 20 to perform a requested operation as indicated by the user input and provided by the control signals.

The controller 208 is also configured to generate control signals for the prime mover 18 or for various chassis functions or devices for transportation of the refuse vehicle 10. In an exemplary embodiment, the controller 208 operates the prime mover 18 and the accessories 702 such that a requested function (e.g., a drive operation, operation of a compaction apparatus, etc.) is performed by the prime mover 18 or by the accessories 702.

When the controller 208 identifies, based on the charge level as provided by the battery system 20, that one or more of the accessories 702 should be limited in function to conserve energy, the controller 208 may generate and provide control signals the one or more accessories 702 that causes the one or more accessories to stop operating, or may cease providing control signals to the one or more accessories 702 that should be limited in function. In some embodiments, when the controller 208 identifies that the one or more accessories should be limited in operation, the controller 208 stops generating control signals for the accessories 702 that should be limited in operation, even if a user provides a user input to control those accessories 702. The controller 208 may also operate one or more display devices (e.g., liquid crystal displays (LCDs), light emitting diodes (LEDs), etc.) to notify an operator or user of the refuse vehicle 10 that one or more of the accessories 702 are limited in operation, and specifically which of the one or more accessories 702 have been limited in operation, and why the one or more accessories 702 are limited in operation (e.g., displaying remaining charge level in the batteries 44).

In some embodiments, limiting operation of one or more accessories 702 includes changing a periodicity of operation of the limited operation accessories 702. For example, if the controller 208 determines that the operation of a compaction apparatus should be limited (e.g., the accessory 702b), the controller 208 may increase a time period between subsequent compaction operations. If the compaction apparatus operates after a particular number of stops, or after every time refuse is loaded into the hopper under normal operating conditions, the compaction apparatus may be transitioned into a limited operational mode where the compaction apparatus operates after an increased number of stops, after multiple times refuse is loaded into the hopper, etc. In this way, the accessories 702 may still be operational when limited by the controller 208 due to the charge level of the batteries 44 being low, but operated less frequently.

In some embodiments, the controller 208 may also be configured to receive an override from the HMI 218 or from input device(s) 710 (e.g., buttons, levers, dials, touchscreen displays, user devices, mobile devices, etc.) thereof. The override may remove the limitation on operation of the one or more accessories 702 to thereby allow the user or operator to control the limited operation accessories 702 (e.g., temporarily) to perform necessary tasks. In some embodiments, the controller 208 defaults back to limiting operation of the one or more accessories 702 after a certain amount of time or after the user has performed a certain function. In some embodiments, the controller 208 is configured to operates the accessories 702 into a resting state immediately prior to limiting function of one or more of the accessories 702.

Referring still to FIG. 7, the battery system 20, or more particularly, the supplemental energy source 708 is configured to provide supplemental energy to the batteries 44 when required, according to an exemplary embodiment. The supplemental energy source 708 may be or include an auxiliary power pack, a fuel cell, a generator driven by a fuel cell, etc. In some embodiments, the supplemental energy source 708 includes the fuel tanks 104, the accessory prime mover 110, and the generator 116. For example, when the supplemental energy source 708 is required, the accessory prime mover 110 may consume fuel (e.g., CNG) provided by the tanks 104, drive the generator 116, and provide generated electrical energy as the supplemental energy to the batteries 44, or directly to the prime mover 18 (e.g., for transportation of the refuse vehicle 10 or for charging the batteries 44 so that the prime mover 18 can consume energy provided by the batteries 44 to drive the wheels 22). In some embodiments, the supplemental energy source 708 is only activated or used when a state of charge or charge level of the batteries 44 decreases below a particular level (e.g., when energy available at the batteries 44 is insufficient for use in transporting the refuse vehicle 10 to a charging station, to a home base, to complete a route, etc.). The supplemental energy source 708 may be configured to provide supplemental energy to the battery system 20 to charge the batteries 44, or may operate in parallel with the battery system 20 to provide supplemental energy directly to the prime mover 18 (e.g., when a state of charge of the batteries 44 are low). Referring still to FIG. 7, the supplemental energy source 708 can be configured to provide hydraulic power to the accessories 702. For example, if one or more of the accessories 702 consume hydraulic power to operate, the supplemental energy source 708 may provide hydraulic power to the one or more accessories 702 that use hydraulic power to operate.

Advantageously, one or more of the accessories 702 can be limited in operation and the supplemental energy source 708 can be activated (e.g., by the controller 208 or by providing control signals to the controller 208) when required for transportation purposes of the refuse vehicle 10. Limiting the operation of one or more of the accessories 702 and activating the supplemental energy source 708 can extend a range of the refuse vehicle 10. In some embodiments, thresholds of the charge level (e.g., the state of charge) of the batteries 44 are adjustable based on the GPS data provided by the GPS 706, driving habits of the driver, historical data of energy usage of the particular refuse vehicle 10, etc.

Referring to FIG. 8, a process 800 for operating a refuse vehicle for range extension (e.g., by limiting operation of various body or accessory functions, or by activating a supplemental energy source) is shown, according to an exemplary embodiment. The process 800 includes steps 802-816 and may be performed by the controller 208 or more generally by the range extension system 700 of the refuse vehicle 10. The process 800 can be performed so that the refuse vehicle 10 has sufficient capabilities or the ability to return safely to a home base, to a charging station, to extend a transportation range of the refuse vehicle 10, etc.

The process 800 includes operating accessories of an electric refuse vehicle using energy provided by an electrical storage system (ESS) of the electric refuse vehicle (step 802), according to some embodiments. In some embodiments, the accessories include various body functions, lifting apparatuses, compaction apparatuses, etc., of the electric refuse vehicle that consume electrical energy. In some embodiments, the accessories include any lighting, accessory, radio, wireless communications, driver monitoring systems, telematics, etc., of the electric refuse vehicle. More generally, the accessories can include any components, devices, systems, sub-systems, etc., that consume electrical energy to operate. The accessories can consume electrical energy provided by the ESS or batteries of the ESS that are on-board the electric refuse vehicle. The electric refuse vehicle may be the refuse vehicle 10 as described in greater detail above with reference to FIGS. 1-6. In some embodiments, the ESS is the battery system 20. In some embodiments, the accessories are the accessories 702 of the refuse vehicle 10. In some embodiments, step 802 also includes operating one or more body functions, chassis functions, etc., or otherwise operating the electric refuse vehicle under normal conditions. For example, the step 802 may include, receiving at the controller 208, a user input or a control input, and generating control signals for the accessories (e.g., body functions) and/or chassis functions according to the control input.

The process 800 includes monitoring available energy in the ESS (step 804), according to some embodiments. In some embodiments, step 804 is performed by the controller 208 or processing circuitry thereof by receiving a state of charge or a charge level from the ESS in real-time, intermittently, near real-time, periodically, etc. In some embodiments, step 804 and step 806 are performed simultaneously or concurrently with each other. In some embodiments, step 804 includes obtaining the state of charge from the ESS and analyzing the state of charge to determine if one or more of the accessories should be limited in operation.

The process 800 includes determining if sufficient energy is available (step 806), according to some embodiments. In some embodiments, the step 806 is performed by the controller 208 or processing circuitry thereof. In some embodiments, the step 806 includes comparing the state of charge, charge level, or available energy in the ESS to a threshold value. If the state of charge, charge level, or available energy is less than the threshold value (step 806, "NO"), the process 800 proceeds to step 808, according to some embodiments. If the state of charge, charge level, or available energy is greater the threshold value (step 806, "YES"), the process 800 returns to step 802 and continues operating the electric refuse vehicle normally. In some embodiments, the threshold are preset or predetermined values. In some embodiments, the threshold is an adjustable parameter that is determined by the controller based on historical energy consumption of the electric refuse vehicle for transportation, driver habits, etc., so that the threshold is specific to the electric refuse vehicle (e.g., model, equipment, vehicle infrastructure, driver-specific, ESS capacity specific, etc.).

The process 800 includes limiting operation of one or more accessories of the electric refuse vehicle to extend travel distance of the electric refuse vehicle (step 808), according to some embodiments. In some embodiments, the step 808 is performed by the controller 208 in response to a determination that there is not sufficient energy available at the ESS (e.g., that the state of charge or available energy in the ESS is less than the threshold). In some embodiments, step 808 includes determining which of the accessories can be limited in operation to prolong a battery life or to increase a range of the electric refuse vehicle. For example, accessories such as a compaction apparatus may be limited if the controller 208 determines that such functions are unnecessary or can be limited. In some embodiments, the step 808 includes limiting control signals being provided to the one or more accessories that should be limited in operation or providing control signals to the one or more accessories to limit operation thereof. In some embodiments, limiting operation of one or more accessories of the electric refuse vehicle includes shutting off power to the one or more accessories (e.g., body functions) of the refuse vehicle.

The process 800 includes operating a primary mover of the electric refuse vehicle to consume electrical energy provided by the ESS for transportation of the electric refuse vehicle (step 810), according to some embodiments. In some embodiments, the step 810 includes providing electrical energy to the primary mover (e.g., an electric motor) from the ESS so that the electric refuse vehicle operates to transport (e.g., to a next jobsite, along a collection route, to return to a home base, to travel to a charging station, etc.). In some embodiments, the step 810 also includes providing energy from the ESS to one or more of the accessories that are not limited in their operation. In some embodiments, the step 810 is performed by generating control signals for the primary mover so that the primary mover consumes electrical energy and drives wheels or tractive elements of the electric refuse vehicle.

The process 800 includes determining if the energy available in the ESS is below another threshold (step 812), according to some embodiments. In some embodiments, the threshold used in step 812 is different than the threshold used in the step 806. In some embodiments, the threshold used in step 812 is lower than the threshold used in the step 806. In some embodiments, the threshold used in step 806 is a first charge level (e.g., a 50% charge level) and the threshold used in step 812 is a second charge level (e.g., a 20% charge level). When the state of charge of the ESS decreases below the first charge level, the controller 208 may limit operation of certain accessories to conserve energy in the ESS to extend a range of the electric vehicle. When the state of charge of the ESS decreases below the second charge level, the controller 208 may activate a supplemental energy source to provide auxiliary power for the electric refuse vehicle (see e.g., steps 814-816). In some embodiments, the steps 808-810 and the steps 814-816 are performed simultaneously in response to the state of charge of the ESS decreasing below a single threshold (e.g., a 50% charge level). In some embodiments, in response to the state of charge of the ESS or batteries thereof being below the threshold (step 812, "YES"), the process 800 proceed to the step 814. In some embodiments, in response to the state of charge of the ESS or batteries thereof being greater than the threshold (step 812, "NO"), the process 800 returns to the step 810.

The process 800 includes operating a supplemental energy source to generate electrical energy (step 814), according to some embodiments. In some embodiments, the supplemental energy source is or includes the APU 120, an auxiliary power pack, a fuel cell, a generator driven by a fuel cell, engine, CNG engine, etc. In some embodiments, the supplemental energy source includes the fuel tanks 104, the accessory prime mover 110, and the generator 116. For example, when the supplemental energy source is required, the accessory prime mover may consume fuel such as CNG that is provided by the tanks 104, and drive a generator that generates electrical energy.

The process 800 includes using the generated electrical energy to at least one of charge the ESS or to directly power the primary mover of the electric refuse vehicle (step 816), according to some embodiments. In some embodiments, the generated electrical energy is provided to the batteries 44 of the battery system 20 to charge the batteries 44. In some embodiments, the batteries 44 can then be discharged (e.g., concurrently with being charged by the generated electrical energy) and the discharged electrical energy is provided to the prime mover of the electric refuse vehicle, or to one or more of the accessories of the electric refuse vehicle so that a transportation range of the electric refuse vehicle is increased.

Figure 9:
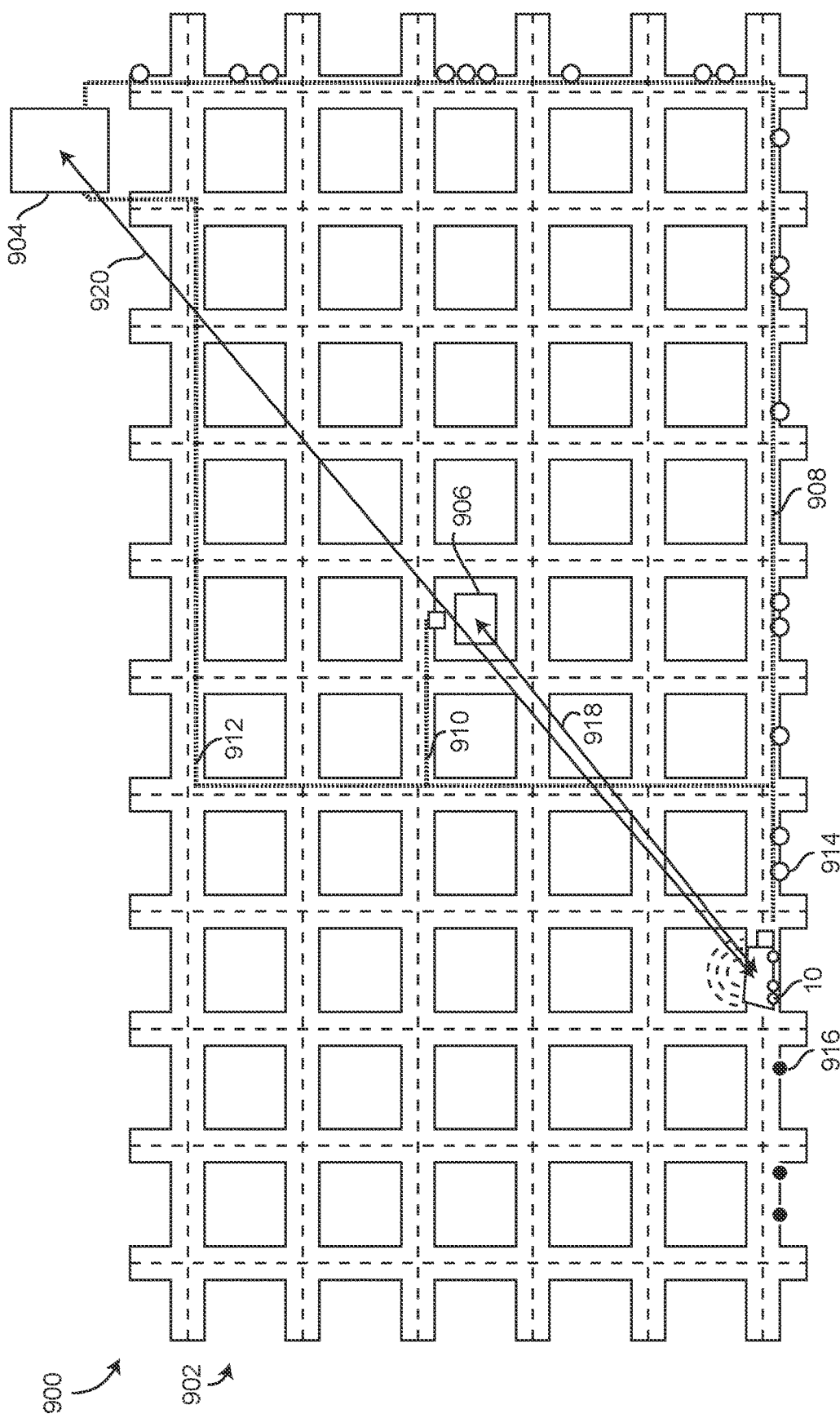
FIG. 9 is a diagram of a map showing a current location of the refuse vehicle of FIG. 1 along a collection route, which can be used to determine required amounts of energy for completing the collection route, according to an exemplary embodiment.

Referring to FIG. 9, a diagram 900 shows a map 902 illustrating a current location of the refuse vehicle 10 along a collection route 908. The map 902 illustrates roads and city blocks along which refuse containers may be positioned for the refuse vehicle 10 to service (e.g., empty contents of the refuse containers into the hopper and transport collected refuse). The map 902 includes a charging station 906 (e.g., the charging station 302) and a home base, landfill, etc., shown as home location 904. The refuse vehicle 10 can return to the home location 904 when the route is completed and empty the contents of the body 14. As shown in FIG. 9, emptied containers 916 and unemptied containers 914 are positioned along the collection route 908.

Referring to FIGS. 7 and 9, the GPS 706 can provide GPS data indicating a current location of the refuse vehicle 10 (e.g., a current location on the map 902). The controller 208 may determine a relative distance 918 between the refuse vehicle 10 and the charging station 906 (or a closest of multiple charging stations 906), and a relative distance 920 between the refuse vehicle 10 and the home location 904. In some embodiments, a charging station is also positioned at the home location 904. The controller 208 may determine a quickest route 910 from the current location of the refuse vehicle 10 to the charging station 906, and a quickest route 912 from the current location of the refuse vehicle 10 to the home location 904. In some embodiments, the controller 208 also includes (e.g., stored in memory thereof, provided by a remote communications or cloud system) the collection route 908 of the refuse vehicle 10. If the controller 208 determines that the charge level of the batteries 44 is currently insufficient to complete transportation along the collection route 908, the controller 208 may limit operation of one or more of the accessories 702, activate the supplemental energy source 708, etc. If the controller 208 determines that, even if the one or more accessories 702 are limited in operation and the supplemental energy source 708 is activated, that there is insufficient energy available to complete transportation of the refuse vehicle 10 along the collection route 908 (in combination with proper operation of the accessories 702 for collection of waste), the controller 208 may prompt the operator to either return along the quickest route 912 to the home location 904 for proper charging, or may prompt the operator to transport along the quickest route 910 to the nearest charging station 906 for charging the batteries 44 of the refuse vehicle 10 so that the collection route 908 can be completed. In this way, the controller 208 can use GPS data, route data, known locations of charging stations or landfills or home bases, etc., to determine if one or more of the accessories 702 should be limited in operation to increase range of the refuse vehicle 10 such that the collection route 908 can be completed.

In some embodiments, the controller 208 uses a distance of the collection route 908, historical data indicating the driver's habits, specific information about the refuse vehicle 10, an estimated number of stops along the collection route 908, etc., to determine a required amount of energy that must be supplied by the batteries 44 and/or the supplemental energy source 708. In some embodiments, the required amount of energy for completing the collection route 908 is set as or used to determine the thresholds (e.g., the first charge level and the second charge level, or the thresholds as described in greater detail above with reference to FIGS. 7-8).

It should be understood that the range extension system 700 as described herein with reference to FIGS. 7-8 is usable with a fully electric vehicle, a hybrid-electric vehicle, etc. For example, while FIG. 7 shows the battery system 20 providing electrical energy to the prime mover 18, the prime mover 18 may also be an internal combustion engine that is configured to operate using fuel (e.g., gasoline, diesel, CNG, etc.), and the battery system 20 may be configured to provide electrical energy for the accessories 702 of the refuse vehicle 10. Similarly, the prime mover 18 may be an electric motor that is configured to consume electrical energy provided by the battery system 20 (e.g., when the range extension system 700 is implemented in a fully-electric refuse vehicle).

Figure 10:
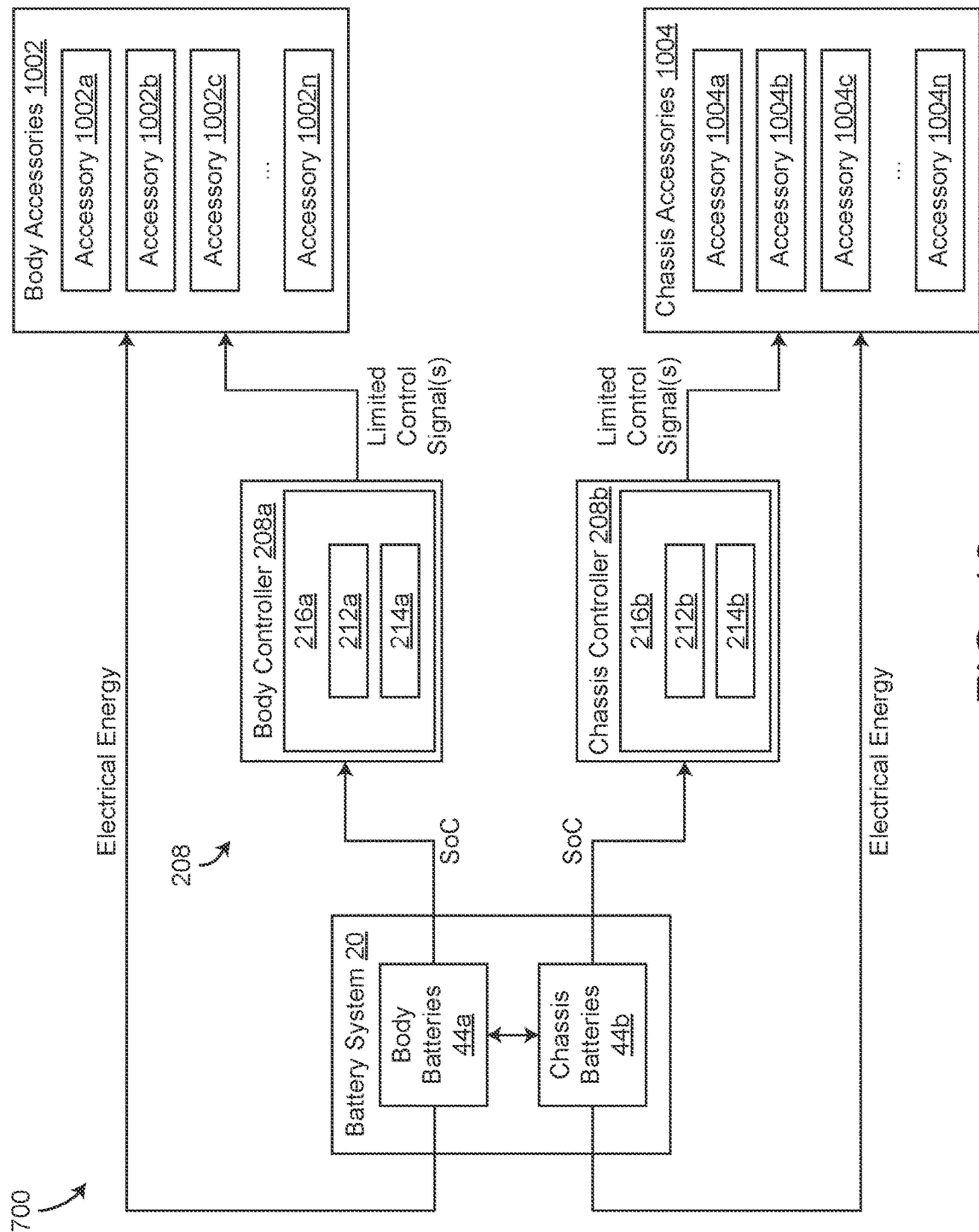
FIG. 10 is a diagram showing a portion of the range extension system of FIG. 7 including a body controller and a chassis controller, according to some embodiments.

Referring to FIG. 10, the controller 208 may be provided as or include a body controller 208a and a chassis controller 208b, according to an exemplary embodiment. The body controller 208a and the chassis controller 208b can be similar to each other (e.g., each including processing circuitry 216, processor 212, and memory 214, etc.) but configured to operate body accessories 1002 and chassis accessories 1004, respectively. In particular, the body controller 208a includes processing circuitry 216a having a processor 212a and memory 214a, and is configured to operate (e.g., based on a user input, based on a state of charge or energy level provided by the battery system 20, etc.) the body accessories 1002. Similarly, the chassis controller 208b includes processing circuitry 216b having a processor 212b and memory 214b, and is configured to operate (e.g., based on a user input, based on a state of charge or energy level provided by the battery system 20, etc.) the chassis accessories 1004.

In some embodiments, the body controller 208a and the chassis controller 208b are configured to operate similarly to the controller 208 as described in greater detail above with reference to FIG. 7. In some embodiments, the battery system 20 includes body batteries 44a and chassis batteries 44b. The body batteries 44a are configured to provide electrical energy for consumption or use by the body accessories 1002 (e.g., accessory 1002a, accessory 1002b, accessory 1002c, . . . , accessory 1002n, etc.), and the chassis batteries 44b are configured to provide electrical energy for consumption or use by the chassis accessories 1004 (e.g., accessory 1004a, accessory 1004b, accessory 1004c, . . . , accessory 1004n, etc.). The body batteries 44a and the chassis batteries 44b may configured to exchange electrical energy therebetween the body batteries 44a and the chassis batteries 44b such that when the body batteries 44a are low in energy, the chassis batteries 44b may charge the body batteries 44a or vice versa. The body accessories 1002 and the chassis accessories 1004 can be the same as or similar to any of the accessories 702 as described in greater detail above with reference to FIG. 7.

In some embodiments, the body controller 208 is configured to receive a state of charge of the body batteries 44a and the chassis controller 208b is configured to receive a state of charge of the chassis batteries 44b from the battery system 20. The body controller 208a can limit operation of the body accessories 1002 (e.g., using any of, or any similar techniques as described in greater detail above with reference to FIG. 7) based on the state of charge of the body batteries 44a, and the chassis controller 208b can limit operation of the chassis accessories 1004 (e.g., using any of, or any similar techniques as described in greater detail above with reference to FIG. 7) based on the state of charge of the chassis batteries 44b. In this way, the functionality of the controller 208 as described in greater detail above can be performed at the body controller 208a or the chassis controller 208b specifically for the body accessories 1002 or the chassis accessories 1004. In some embodiments, the body controller 208a and/or the chassis controller 208b are configured to operate cooperatively to limit operation of the body accessories 1002 or the chassis accessories 1004. In some embodiments, the body controller 208a is configured to receive the state of charge from the body batteries 44a or the chassis batteries 44b and limit operation of the body accessories 1002 or the chassis accessories 1004, or both. Similarly, the chassis controller 208b may be configured to receive the state of charge from the body batteries 44a or the chassis batteries 44b and limit operation of the body accessories 1002 or the chassis accessories 1004, or both.

Figure 11:
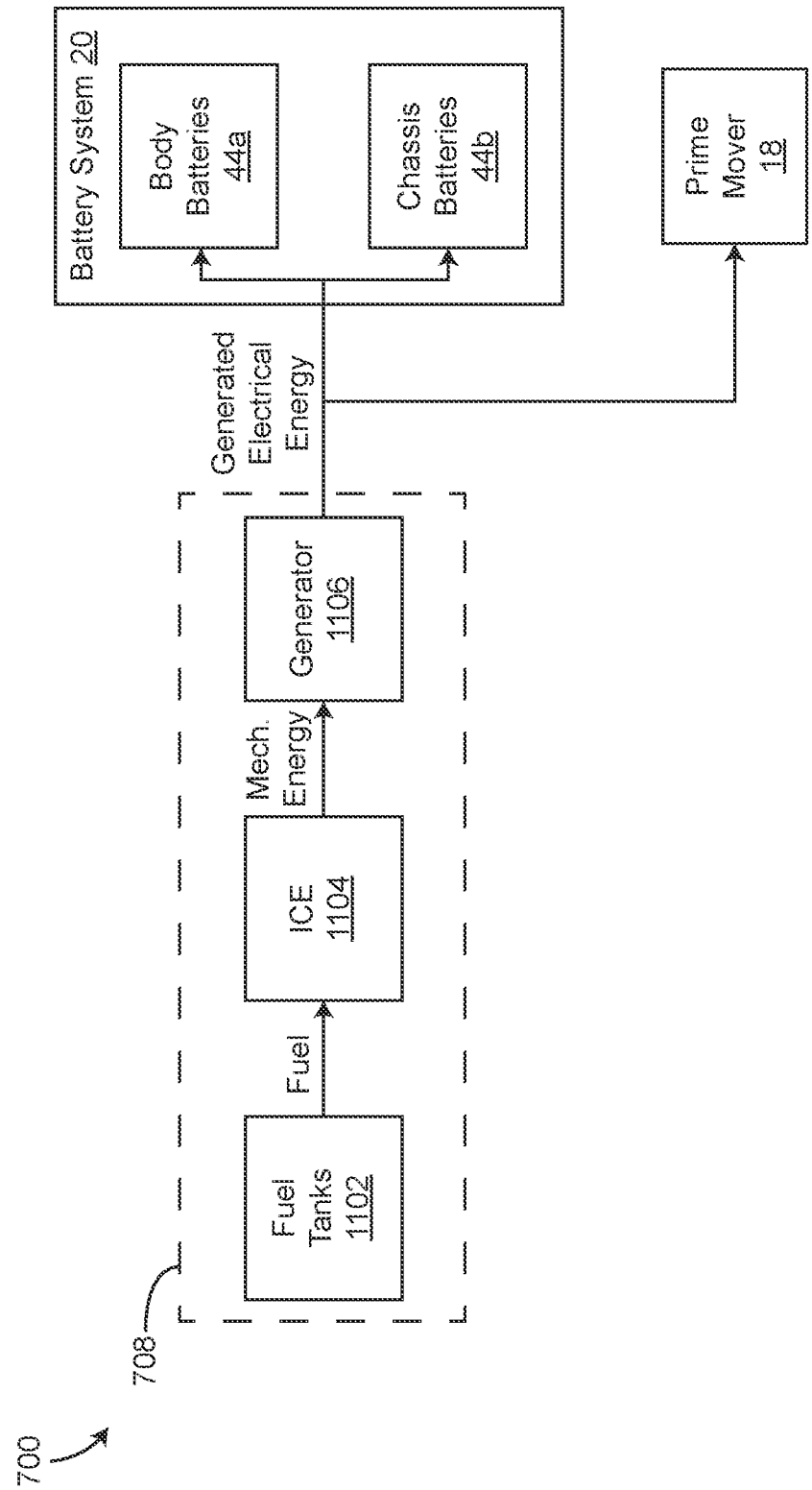
FIG. 11 is a diagram showing a portion of the range extension system of FIG. 7

Referring to FIG. 11, a portion of the range extension system 700 shows an implementation of the supplemental energy source 708 for providing electrical energy to the battery system 20 (e.g., to the batteries 44, the body batteries 44a, the chassis batteries 44b, etc.). In an exemplary embodiment, the supplemental energy source 708 includes fuel tanks 1102, an internal combustion engine (ICE) 1104, and a generator 1106. The ICE 1104 may be a diesel ICE, a gasoline ICE, a CNG engine, etc., or any other ICE configured to receive fuel, combust the fuel, and output mechanical energy to a generator 1106. In some embodiments, the fuel tanks 1102 are configured to store a fuel (e.g., gasoline, diesel, CNG, etc.) and provide the fuel to the ICE 1104. In some embodiments, the ICE 1104 outputs the mechanical energy to the generator 1106 to drive the generator 1106 to generate electrical energy. The generated electrical energy can be provided to the battery system 20 (e.g., to the body batteries 44a, the chassis batteries 44b, etc.) to charge the batteries 44 of the battery system 20, or alternatively to the prime mover 18 to provide additional electrical energy to the prime mover 18. Advantageously, the supplemental energy source 708 can be provided as a generator set to generate electrical energy for charging the battery system 20 or for providing additional electrical energy to the prime mover 18 (e.g., when a state of charge of the battery system 20 is low or below a threshold).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:
    a plurality of tractive elements;
    a prime mover configured to generate mechanical energy to drive one or more of the plurality of tractive elements;
    a plurality of accessories configured to consume electrical energy to perform functions; and
    a range extension system comprising:
        a battery configured to provide electrical energy for the plurality of accessories; and
        a controller configured to:
            obtain a state of charge of the battery; and
            limit operation of at least one of the plurality of accessories in response to the state of charge of the battery to extend a transportation range of the refuse vehicle.

2. The refuse vehicle of claim 1, wherein the refuse vehicle is a fully electric refuse vehicle and the prime mover an electric motor configured to consume electrical energy provided by the battery to drive one or more of the plurality of tractive elements for transportation of the refuse vehicle.

3. The refuse vehicle of claim 1, wherein the controller is configured to limit operation of at least one of the plurality of accessories in response to the state of charge of the battery decreasing below a threshold value, wherein limiting operation of at least one of the plurality of accessories conserves energy discharge of the battery and extends the transportation range of the refuse vehicle.

4. The refuse vehicle of claim 1, wherein the range extension system further comprises a supplemental energy source, wherein the controller is configured to activate the supplemental energy source to charge the battery in response to the state of charge of the battery or to provide supplemental energy to the prime mover.

5. The refuse vehicle of claim 4, wherein the supplemental energy source is any of:
   an additional battery pack;
   a fuel cell; or
   an accessory power unit comprising:
      a plurality of tanks configured to store a fuel;
      a generator configured to be driven to generate electrical energy to charge the battery; and
      an engine configured to consume the fuel and drive the generator.

6. The refuse vehicle of claim 5, wherein the fuel stored by the plurality of tanks is a compressed natural gas (CNG) and the engine is a CNG engine configured to consume the CNG to drive the generator.

7. The refuse vehicle of claim 1, wherein the range extension system further comprises a global positioning system (GPS) configured to provide a current geographical position of the refuse vehicle to the controller, wherein the controller is further configured to:
   determine an amount of energy required for the refuse vehicle to complete a collection route; and
   limit operation of at least one of the plurality of accessories in response to the state of charge of the battery indicating that the battery is currently insufficient to provide the amount of energy required.

8. The refuse vehicle of claim 1, wherein limiting operation of at least one of the plurality of accessories comprises at least one of:
   restricting operation of a body function of the refuse vehicle;
   causing subsequently performed operations of the body function of the refuse vehicle to be performed less frequently; or
   shutting off power to the body function of the refuse vehicle.

9. A range extension system for a refuse vehicle comprising:
   a battery configured to provide electrical energy for a plurality of accessories of the refuse vehicle; and
   a controller configured to:
      obtain a state of charge of the battery; and
      limit operation of at least one of the plurality of accessories in response to the state of charge of the battery to extend a transportation range of the refuse vehicle.

10. The range extension system of claim 9, wherein the refuse vehicle is a fully electric refuse vehicle and a prime mover of the refuse vehicle is an electric motor configured to consume electrical energy provided by the battery to drive one or more tractive elements for transportation of the refuse vehicle.

11. The range extension system of claim 9, wherein the controller is configured to limit operation of at least one of the plurality of accessories in response to the state of charge of the battery decreasing below a threshold value, wherein limiting operation of at least one of the plurality of accessories conserves energy discharge of the battery and extends the transportation range of the refuse vehicle.

12. The range extension system of claim 9, further comprising a supplemental energy source, wherein the controller is configured to activate the supplemental energy source to charge the battery in response to the state of charge of the battery or to provide supplemental energy to a prime mover of the refuse vehicle.

13. The range extension system of claim 12, wherein the supplemental energy source is any of:
   an additional battery pack;
   a fuel cell; or
   an accessory power unit comprising:
      a plurality of tanks configured to store a fuel;
      a generator configured to be driven to generate electrical energy to charge the battery; and
      an engine configured to consume the fuel and drive the generator.

14. The range extension system of claim 13, wherein the fuel stored by the plurality of tanks is a compressed natural gas (CNG) and the engine is a CNG engine configured to consume the CNG to drive the generator.

15. The range extension system of claim 9, further comprising a global positioning system (GPS) configured to provide a current geographical position of the refuse vehicle to the controller, wherein the controller is further configured to:
   determine an amount of energy required for the refuse vehicle to complete a collection route; and
   limit operation of at least one of the plurality of accessories in response to the state of charge of the battery indicating that the battery is currently insufficient to provide the amount of energy required.

16. The range extension system of claim 9, wherein limiting operation of at least one of the plurality of accessories comprises at least one of:
   restricting operation of a body function of the refuse vehicle;
   causing subsequently performed operations of the body function of the refuse vehicle to be performed less frequently; or
   shutting off power to the body function of the refuse vehicle.

17. A method for increasing a transportation range of a refuse vehicle, the method comprising:
   operating accessories of the refuse vehicle using energy provided by an electrical storage system (ESS);
   obtaining a state of charge of the ESS;
   in response to the state of charge of the ESS indicating an insufficient amount of energy is available, at least one of:
      limiting operation of at least one accessory of the refuse vehicle; or
      activating a supplemental energy source to charge the ESS;
      wherein limiting operation of at least one accessory of the refuse vehicle or activating the supplemental energy source increases the transportation range of the refuse vehicle;
   in response to the state of charge of the ESS indicating that a sufficient amount of energy is available:
      continuing to operate the accessories of the refuse vehicle using energy provided by the ESS without limiting operation of any of the accessories and without activating the supplemental energy source.

18. The method of claim 17, wherein the supplemental energy source is any of:
   an additional battery pack;
   a fuel cell; or an accessory power unit comprising:
- a plurality of tanks configured to store a fuel;
- a generator configured to be driven to generate electrical energy to charge the ESS; and
- an engine configured to consume the fuel and drive the generator.

19. The method of claim 18, wherein the fuel stored by the plurality of tanks is a compressed natural gas (CNG) and the engine is a CNG engine configured to consume the CNG to drive the generator.

20. The method of claim 17, wherein limiting operation of at least one accessory comprises at least one of:
- restricting operation of a body function of the refuse vehicle;
- causing subsequently performed operations of the body function of the refuse vehicle to be performed less frequently; or
- shutting off power the body function of the refuse vehicle.

* * * * *